United States Patent
Miyahara

(10) Patent No.: US 10,606,868 B2
(45) Date of Patent: Mar. 31, 2020

(54) INFORMATION PROCESSING DEVICE, INFORMATION PROCESSING METHOD, AND PROGRAM

(71) Applicant: SONY CORPORATION, Tokyo (JP)

(72) Inventor: Masanori Miyahara, Tokyo (JP)

(73) Assignee: SONY CORPORATION, Tokyo (JP)

( * ) Notice: Subject to any disclaimer, the term of this patent is extended or adjusted under 35 U.S.C. 154(b) by 157 days.

(21) Appl. No.: 15/559,146

(22) PCT Filed: May 6, 2016

(86) PCT No.: PCT/JP2016/063621
§ 371 (c)(1),
(2) Date: Sep. 18, 2017

(87) PCT Pub. No.: WO2016/185913
PCT Pub. Date: Nov. 24, 2016

(65) Prior Publication Data
US 2018/0067967 A1    Mar. 8, 2018

(30) Foreign Application Priority Data
May 19, 2015 (JP) .................................. 2015-101573

(51) Int. Cl.
*G06F 17/30* (2006.01)
*G06K 9/00* (2006.01)
(Continued)

(52) U.S. Cl.
CPC .......... *G06F 16/29* (2019.01); *G06F 16/9535* (2019.01); *G06K 9/00778* (2013.01);
(Continued)

(58) Field of Classification Search
CPC . G09B 29/106; G09B 29/007; G06F 16/9535; G06F 16/29; G06K 9/00778; H04L 67/306; G06Q 30/02
See application file for complete search history.

(56) References Cited

U.S. PATENT DOCUMENTS 8,818,101 B1 * 8/2014 Lim .......................... G06T 7/33
345/629
2009/0115617 A1    5/2009 Sano et al.
(Continued)

FOREIGN PATENT DOCUMENTS

JP    2002-218436 A    8/2002
JP    2003-029625 A    1/2003
(Continued)

OTHER PUBLICATIONS

International Search Report dated Jul. 26, 2016, in PCT/JP2016/063621 filed May 6, 2016.

*Primary Examiner* — Mussa A Shaawat
(74) *Attorney, Agent, or Firm* — Xsensus LLP

(57) ABSTRACT

The present technology relates to an information processing device, an information processing method, and a program that enable efficient generation of a spatiotemporal map.
A requester selection unit selects a requester of data concerning a certain location on a spatiotemporal map in which data changes with time from among a plurality of data acquisition units on the basis of at least one of contexts and profiles of the data acquisition units as well as contents of requested data. A data requesting unit requests data from the requester. A map generation unit generates the spatiotemporal map using data from the requester. The present technology can be provided, for example, to a server that provides a spatiotemporal map.

9 Claims, 17 Drawing Sheets

(51) Int. Cl.
    *G09B 29/00*      (2006.01)
    *G09B 29/10*      (2006.01)
    *G06F 16/29*      (2019.01)
    *G06F 16/9535*    (2019.01)
    *G06Q 30/02*      (2012.01)
    *G08B 13/196*     (2006.01)
    *H04L 29/08*      (2006.01)

(52) U.S. Cl.
    CPC ......... *G09B 29/007* (2013.01); *G09B 29/106* (2013.01); *G06Q 30/02* (2013.01); *G08B 13/19608* (2013.01); *H04L 67/306* (2013.01)

(56) References Cited

U.S. PATENT DOCUMENTS

| | | | |
|---|---|---|---|
| 2011/0313779 A1 | 12/2011 | Herzog et al. | |
| 2013/0238242 A1* | 9/2013 | Yoshizumi | G01C 21/3446 |
| | | | 701/533 |
| 2014/0365552 A1* | 12/2014 | Sano | G06Q 30/02 |
| | | | 709/202 |
| 2016/0216116 A1* | 7/2016 | Kourogi | G01C 21/12 |

FOREIGN PATENT DOCUMENTS

| | | |
|---|---|---|
| JP | 2004-184106 A | 7/2004 |
| JP | 2005-039612 A | 2/2005 |
| JP | 2005-241715 A | 9/2005 |
| JP | 2009-098446 A | 5/2009 |
| JP | 2011-022004 A | 2/2011 |
| JP | 2013-534662 A | 9/2013 |

* cited by examiner

FIG. 3

| LOCATION ID | TIME | DATA TYPE | DATA | NUMBER OF ACCESSES |
|---|---|---|---|---|
| ... | ... | ... | ... | ... |
| 123 | 2015/04/01 15:00 | NUMBER OF PEOPLE WHO STAYED IN THIS LOCATION WITHIN PAST 1 HOUR | 2035 | 163 |
| 123 | 2015/04/01 16:00 | NUMBER OF PEOPLE WHO STAYED IN THIS LOCATION WITHIN PAST 1 HOUR | 42628 | 2050 |
| ... | ... | ... | ... | ... |
| 123 | 2015/04/01 15:00 | PICTURES TAKEN IN THIS LOCATION WITHIN PAST 1 HOUR | { PICTURE DATA } | 16 |
| 123 | 2015/04/01 16:00 | PICTURES TAKEN IN THIS LOCATION WITHIN PAST 1 HOUR | { PICTURE DATA } | 1260 |
| ... | ... | ... | ... | ... |

INFORMATION PROCESSING DEVICE, INFORMATION PROCESSING METHOD, AND PROGRAM

TECHNICAL FIELD

The present technology relates to an information processing device, an information processing method, and a program, and more particularly to an information processing device, an information processing method, and a program that enable efficient generation of a spatiotemporal map.

BACKGROUND ART

Conventionally, a spatial map showing data on each location in a predetermined space is widely used. Examples of the spatial map include a topographic map obtained through surveys and a railroad route map.

Moreover, in recent years, a spatial map in which displayed data changes with time (hereinafter, referred to as a spatiotemporal map) is also widely used. Examples of the spatiotemporal map include a weather map and a traffic map.

In order to improve the accuracy of data in the spatiotemporal map, it is desired to collect more types of data at a finer spatial density and at a shorter time interval. For that purpose, however, it is necessary to increase the number of sensors and the like to be used for data collection and increase the frequency at which the sensors and the like acquire data, which results in a rise in required costs and an increase in consumption power.

In contrast, Patent Literature 1 proposes a technology in which, in a case where an event to be notified is detected within a monitoring area by a photo-sensor and a microwave sensor, a camera is turned on to start transmission of images obtained by imaging the monitoring area, and after the event is finished, the camera is turned off to stop transmission of images. Use of this technology allows power saving to be achieved.

CITATION LIST

Patent Literature

Patent Literature 1: JP2005-39612A

DISCLOSURE OF INVENTION

Technical Problem

However, the technology described in the Patent Literature 1 merely controls turning on/off of the camera fixed within the monitoring area, and can only be applied to a spatiotemporal map of a type in which an image of the same location captured by the same camera changes with time.

Therefore, the present technology enables efficient generation of any spatiotemporal map.

Solution to Problem

An information processing device according to an aspect of the present technology includes: a requester selection unit configured to select a requester of data concerning a certain location on a spatiotemporal map in which data changes with time from among a plurality of data acquisition units on the basis of at least one of contexts and profiles of the data acquisition units as well as contents of requested data; a data requesting unit configured to request data from the requester; and a map generation unit configured to generate the spatiotemporal map using data from the requester.

The contexts of the data acquisition units can be caused to include contexts of users who use the data acquisition units. The request selection unit can be caused to estimate likelihoods that the users provide data concerning the certain location on the basis of the contexts of the users, and select the requester on the basis of an estimated result.

The profiles of the data acquisition units can be caused to include past track records of providing data of users who use the data acquisition units. The request selection unit can be caused to select the requester on the basis of the past track records of providing data of the users.

An event detection unit configured to detect an event in a space corresponding to the spatiotemporal map on the basis of data from a plurality of the data acquisition units can be caused to be further included. The requester selection unit can be caused to select a requester of data concerning a vicinity of a location in which the event has been detected.

The requester selection unit can be caused to select a requester of data concerning a vicinity of a location specified by a user who uses the spatiotemporal map.

A reward setting unit configured to set a reward for data on the basis of a value of requested data can be caused to be further included. The data requesting unit can be caused to notify the requester of a set reward.

The reward setting unit can be caused to set the reward on the basis of an estimated value of the number of accesses to the requested data.

A condition setting unit configured to set a condition for collecting data can be caused to be further included. The requester selection unit can be caused to select the requester from among the data acquisition units capable of acquiring data that satisfies the set condition.

An information processing method according to an aspect of the present technology includes: a requester selection step of selecting a requester of data concerning a certain location on a spatiotemporal map in which data changes with time from among a plurality of data acquisition units on the basis of at least one of contexts and profiles of the data acquisition units as well as contents of requested data; a data requesting step of requesting data from the requester; and a map generation step of generating the spatiotemporal map using data from the requester.

A program according to an aspect of the present technology causes a computer to execute a process including a requester selection step of selecting a requester of data concerning a certain location on a spatiotemporal map in which data changes with time from among a plurality of data acquisition units on the basis of at least one of contexts and profiles of the data acquisition units as well as contents of requested data, a data requesting step of requesting data from the requester, and a map generation step of generating the spatiotemporal map using data from the requester.

According to an aspect of the present technology, a requester of data concerning a certain location on a spatiotemporal map in which data changes with time is selected from among a plurality of data acquisition units on the basis of at least one of contexts and profiles of the data acquisition units as well as contents of requested data. Data is requested from the requester. The spatiotemporal map is generated using data from the requester.

Advantageous Effects of Invention

According to an aspect of the present technology, any spatiotemporal map can be generated efficiently.

In addition, the effects described in the present specification are not limiting but are merely examples, and there may be additional effects.

BRIEF DESCRIPTION OF DRAWINGS

FIG. 3 is a diagram showing an example of a data structure of a spatiotemporal map database.

MODE(S) FOR CARRYING OUT THE INVENTION

Hereinafter, a mode for carrying out the present technology (hereinafter, referred to as an embodiment) will be described. Note that description will be provided in the following order.
1. Embodiment
2. Use cases
3. Variants

1. Embodiment

{Configuration Example of an Information Processing System 101}

Figure 1:
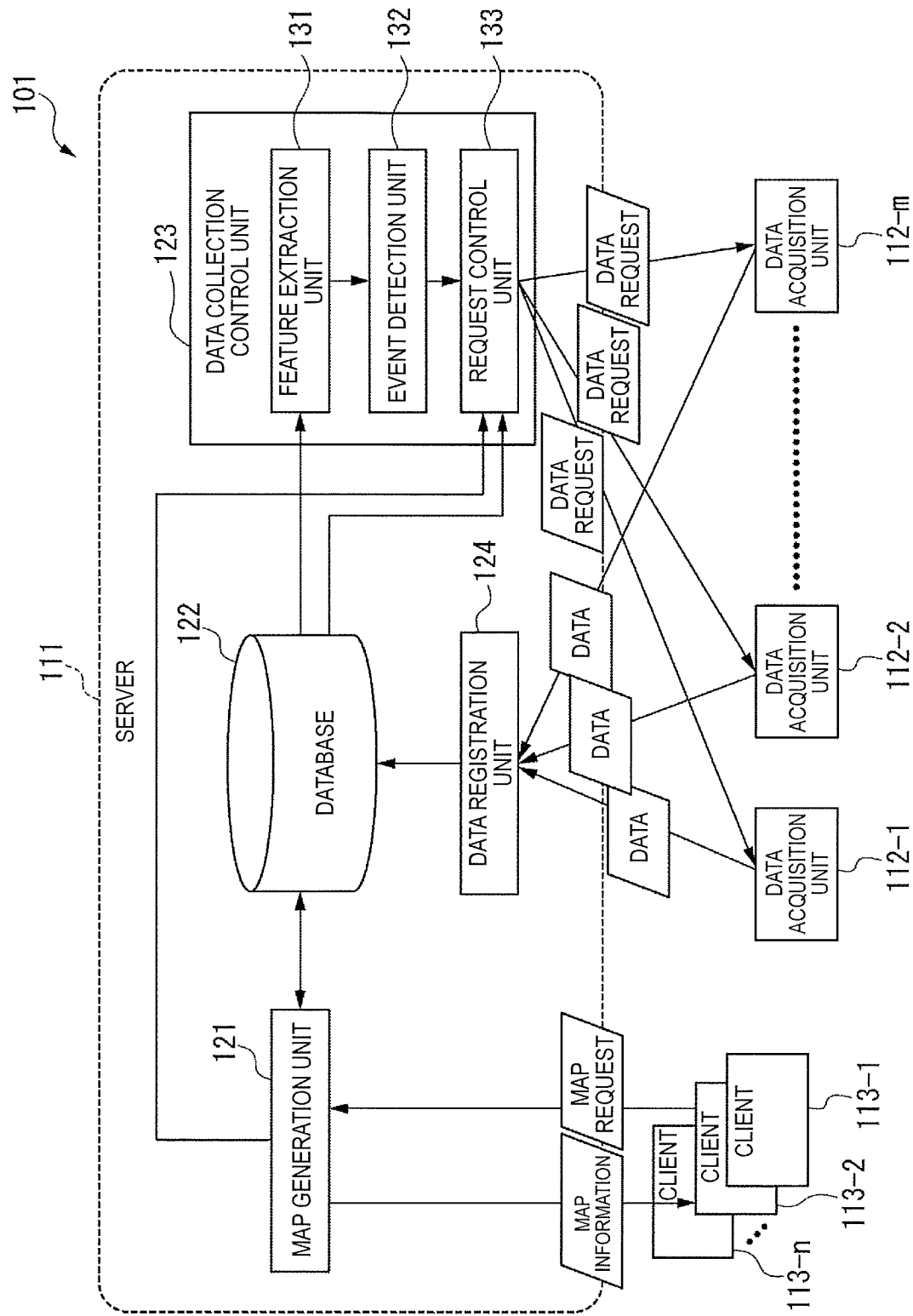
FIG. 1 is a block diagram showing an embodiment of an information processing device to which the present technology has been applied.

FIG. 1 shows an embodiment of an information processing device 101 to which the present technology has been applied. The information processing system 101 is a system that generates a spatiotemporal map and provides the spatiotemporal map to a user.

Note that the type of the spatiotemporal map provided by the information processing system 101 is not particularly restricted. Examples of the spatiotemporal map provided by the information processing system 101 include a weather information map, a tourist spot map, a traffic abnormality map, an agricultural land monitoring map, a contents viewing map, a restaurant review map, a hazard map, a monitoring map, a human body map, and the like.

The weather information map is, for example, a map showing time-series changes in weather conditions in each area.

The tourist spot map is, for example, a map in which data such as events at each tourist spot and the crowded degree is updated with time.

The traffic abnormality map is, for example, a map in which data such as occurrence conditions of automobile accidents and an occurrence history in a predetermined space as well as necessities is updated with time. Here, the necessities include an ambulance, a doctor, and the like, for example.

The agricultural land monitoring map is, for example, a map in which data such as occurrence conditions of abnormality and an occurrence history in an agricultural land in a predetermined space is updated with time.

The contents viewing map is, for example, a map in which data such as the audience rate of various contents and the number of viewers in each area is updated with time.

The restaurant review map is, for example, a map in which display of reviews given to each restaurant in a predetermined space is updated as necessary.

The hazard map is, for example, a map in which data such as locations where crimes or disasters occur in a predetermined space and the probability that crimes or disasters will occur in each location is updated with time.

The human body map is, for example, a map showing time-series changes in data such as the amount and temperature of a predetermined substance in the human body. Here, the amount of a predetermined substance is, for example, the amount of hydrogen atoms measured by magnetic resonance imaging (MRI), or the like.

Note that data in the spatiotemporal map may be updated in real time, or may be updated at predetermined timing. Moreover, the spatiotemporal map may have a function of specifying any time and location and capable of displaying data on the specified time and location.

Note that the spatiotemporal map will hereinafter be simply referred to as a map as well.

The information processing system 101 includes a server 111, data acquisition units 112-1 to 112-$m$, and clients 113-1 to 113-$n$. The server 111, the data acquisition units 112-1 to 112-$m$, and the clients 113-1 to 113-$n$ are connected via a network not shown or the like to perform communication.

Note that, hereinafter, in a case where it is not necessary to distinguish the data acquisition units 112-1 to 112-$m$ individually, they will be simply referred to as a data acquisition unit(s) 112. Hereinafter, in a case where it is not necessary to distinguish the clients 113-1 to 113-$n$ individually, they will be simply referred to as a client(s) 113.

The server 111 includes a map generation unit 121, a database 122, a data collection control unit 123, and a data registration unit 124.

In a case where a map request has been received from the client 113, the map generation unit 121 generates a spatiotemporal map requested by the client 113 using data registered in the database 122. Then, the map generation unit 121 transmits map information including the generated spatiotemporal map to the requesting client 113. Moreover, the map generation unit 121 supplies the received map request to a request control unit 133 as needed.

The database 122 includes a spatiotemporal map database that stores data to be used for the spatiotemporal map, a data acquisition unit database that stores data concerning each data acquisition unit 112, a client database that stores data concerning the client 113, and the like. In the data acquisition unit database, data concerning a user who uses the data acquisition unit 112 is also stored. In the client database, data concerning a user who uses the client 113 is also stored.

Note that, hereinafter, in order to distinguish between a user who uses the data acquisition unit 112 and a user who uses the client 113, the former will be referred to as an owner, and the latter will be referred to as a user.

The data collection control unit 123 controls collection of data from each data acquisition unit 112. The data collection control unit 123 includes a feature extraction unit 131, an event detection unit 132, and the request control unit 133.

The feature extraction unit 131 extracts a feature quantity of the data stored in the spatiotemporal map database, and supplies information that indicates the extracted feature quantity to the event detection unit 132.

The event detection unit 132 detects an event in a space corresponding to the spatiotemporal map (a space covered by the spatiotemporal map) on the basis of the feature quantity extracted by the feature extraction unit 131. The event detection unit 132 supplies the result of event detection to the request control unit 133.

The request control unit 133 controls a request to provide data to each data acquisition unit 112. For example, the request control unit 133 selects a data acquisition unit 112 to which a data request is to be transmitted on the basis of a map request and the result of event detection or the like. Moreover, the request control unit 133 generates a data request including the contents of requested data and a reward or the like on the basis of the map request and the result of event detection or the like. Then, the request control unit 133 transmits the generated data request to the selected data acquisition unit 112.

The data registration unit 124 registers data transmitted from each data acquisition unit 112 in the spatiotemporal map database in the database 122.

The data acquisition unit 112 acquires data to be used for the spatiotemporal map. The form and the like of the data acquisition unit 112 are not particularly restricted as long as data to be used for the spatiotemporal map can be acquired.

For example, the data acquisition unit 112 is configured with a Low-level sensor. The Low-level sensor is, for example, an acceleration sensor, a GPS receiver, a clock, a barometric sensor, a magnetic field sensor, a radio transceiver that performs wireless communication, such as WiFi or Bluetooth (registered trademark), a microphone, a camera, a pedometer, an illuminometer, a thermometer, a hygrometer, a raindrop sensor, or the like.

Moreover, for example, the data acquisition unit 112 is configured with a device that acquires various logs. System logs refer to, for example, an activation log for an application program, a contents viewing log, an item purchase log, a website browsing history, operation logs of various devices, a search keyword log, and the like.

Furthermore, for example, the data acquisition unit 112 is configured with a device that performs various types of recognition. The various types of recognition refer to, for example, activity recognition, voice recognition, image recognition, companion recognition, high-context recognition, and the like. The activity recognition is, for example, to recognize an activity of a person who is resting, walking, running, riding on various types of vehicles (such as a bicycle, a train, a bus, and an automobile, for example), or the like. The image recognition is, for example, to recognize a face, an expression, the age, the sex, a generic object, or the like using an image. The high-context recognition is, for example, to recognize a context of a person who is staying home, staying in the office, shopping, commuting, on a trip, housekeeping, or the like.

In addition, for example, the data acquisition unit 112 is configured with a device that acquires human-input data. The human-input data refers to, for example, a comment in a social networking service (SNS), a product review, a result of manual recognition, an expert's determination, a business determination, a captured/edited still image/video, a summarized sentence, or the like.

Further, for example, the data acquisition unit 112 is configured with a special-purpose device. The special-purpose device refers to, for example, an MRI apparatus, a computed tomography (CT) apparatus, a blood pressure sensor, a heart rate sensor, a clinical thermometer, a Geiger counter, or the like.

In addition, the data acquisition unit 112 is separated into an automatic type, a semi-automatic type, a passive type, and a manual type, for example.

The data acquisition unit 112 of the automatic type operates independently of a data request. That is, with or without a data request from the server 111, the data acquisition unit 112 of the automatic type acquires data periodically at predetermined timing or in a case where a predetermined condition has been satisfied or the like, and transmits the acquired data to the server 111.

The data acquisition unit 112 of the passive type operates in accordance with a data request. For example, in a case where a data request from the server 111 has been received, the data acquisition unit 112 of the passive type acquires data, and transmits the acquired data to the server 111.

The data acquisition unit 112 of the semi-automatic type is the data acquisition unit 112 of a type obtained by combining the automatic type and the passive type. For example, in a case where there is no data request, the data acquisition unit 112 of the semi-automatic type performs an operation similar to the data acquisition unit 112 of the automatic type. On the other hand, in a case where a data request has been received from the server 111, the data acquisition unit 112 of the semi-automatic type operates in accordance with the data request, similarly to the data acquisition unit 112 of the passive type. For example, in a case where a data request from the server 111 has been received, the data acquisition unit 112 of the semi-automatic type acquires data, and transmits the acquired data to the server 111, increases the frequency of acquiring data, or improves the quality or accuracy of acquired data.

The data acquisition unit 112 of the manual type acquires data and transmits the data to the server 111, or is allowed to transmit the data to the server 111, in accordance with a user operation.

Note that it is possible to combine the manual type with another type. For example, the data acquisition unit 112 is capable of operating as the data acquisition unit 112 of the automatic, passive, or semi-automatic type in a case where a user operation has not been performed, and operating as the data acquisition unit 112 of the manual type in a case where a user operation has been performed.

Moreover, for example, the data acquisition unit 112 is also capable of acquiring a plurality of types of data. In this case, for example, the data acquisition unit 112 is capable of transmitting part of the data to the server 111 as the data acquisition unit 112 of the automatic, passive, or semi-automatic type without in accordance with a user operation, and transmitting the remaining data to the server 111 as the data acquisition unit 112 of the manual type in accordance with a user operation.

Furthermore, it is also possible to make switching among the automatic type, passive type, semi-automatic type, and manual type by a setting or the like.

In addition, the data acquisition unit 112 includes one whose installation location is fixed, one whose moving route has been prescribed, and one that can move freely.

The client 113 is configured with equipment of various types capable of utilizing the spatiotemporal map. For example, the client 113 is configured with a smartphone, a tablet, a mobile phone, a personal computer, a wearable device, a game machine, or the like.

The client 113 transmits a map request to the server 111, and on the basis of map information transmitted from the server 111 correspondingly, displays a requested map. Note that the map request includes the type of a spatiotemporal map that a user desires to browse. In addition, it is possible to include in the map request a location where the user desires to view data (hereinafter, referred to as a desire-to-browse location), the contents of data that the user desires to view (hereinafter, referred to as desire-to-browse contents), and the like, as needed.

Note that the data acquisition unit 112 and the client 113 are separate in FIG. 1, whilst they may partly overlap. That is, a single device may acquire data for the spatiotemporal map as the data acquisition unit 112, and may utilize the spatiotemporal map as the client 113.

{Configuration Example of the Request Control Unit 133}

Figure 2:
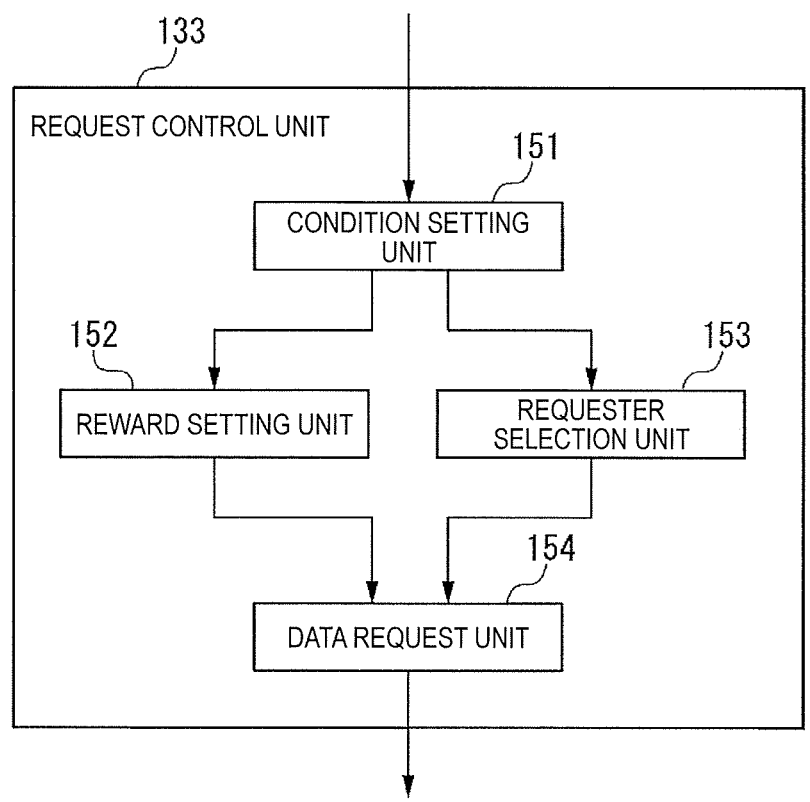
FIG. 2 is a block diagram showing a configuration example of a request control unit.

Next, a configuration example of the request control unit 133 will be described with reference to FIG. 2.

The request control unit 133 includes a condition setting unit 151, a reward setting unit 152, a requester selection unit 153, and a data request unit 154.

The condition setting unit 151 sets a condition for collecting data on the basis of the result of event detection by the event detection unit 132 and a map request supplied from the map generation unit 121 or the like. The condition setting unit 151 notifies the reward setting unit 152 and the requester selection unit 153 of the set condition.

The reward setting unit 152 sets a reward for data on the basis of the condition set by the condition setting unit 151 or the like. The reward setting unit 152 notifies the data request unit 154 of the set reward.

The requester selection unit 153 selects a requester of data from among the data acquisition units 112 on the basis of the condition set by the condition setting unit 151 or the like. The requester selection unit 153 notifies the data request unit 154 of the selected requester.

The data request unit 154 generates a data request including the contents of requested data and the reward or the like, and transmits the generated data request to the data acquisition unit 112 selected as a requester.

{Example of Spatiotemporal Map Database}

FIG. 3 shows an example of a data structure of a spatiotemporal map database. The spatiotemporal map database includes fields of location ID, time, data type, data, and the number of accesses.

In the field of location ID, a location ID for uniquely identifying a location where data is acquired is registered. Note that it is possible to arbitrarily set a method of segmenting locations depending on the type of spatiotemporal map or the like. For example, a space corresponding to the spatiotemporal map may be segmented into mesh-like locations of 100 square meters, and a different location ID may be given to each location. In addition, for example, locations may be segmented into prefectural units or municipal units, and a different location ID may be given to each location.

In the field of time, a time at which data has been acquired is registered.

In the field of data type, the type of acquired data is registered. The data type includes the type and the contents of data, for example. In this example, the data types such as "the number of people who stayed in this location within the past 1 hour" and "a picture taken in this location within the past 1 hour" are registered.

In the field of data, actual acquired data or a storage destination of acquired data, or the like is registered.

In the field of the number of accesses, the number of accesses to data is registered.

{Processes of the Information Processing System 101}

Next, processes of the information processing system 101 will be described.

(Map Providing Process)

Figure 4:
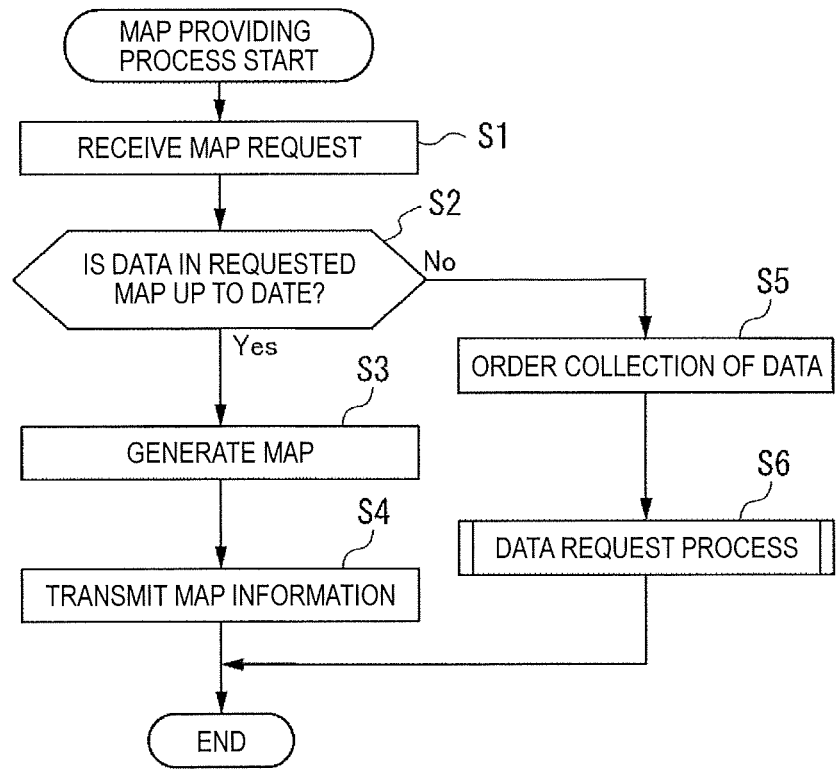
FIG. 4 is a flow chart for illustrating a map providing process.

First, a map providing process executed by the server 111 will be described with reference to the flow chart of FIG. 4. Note that this process is started when a map request is transmitted from the client 113.

In step S1, the map generation unit 121 receives the map request transmitted from the client 113.

In step S2, the map generation unit 121 determines whether data in a requested map is up to date. For example, the map generation unit 121 checks whether a spatiotemporal map database for the map requested by the client 113 has been updated within a predetermined time duration (such as within 1 day, within 1 hour, within 10 minutes, or within 1 minute, for example). Here, the time to update the spatiotemporal map database to be used as a criterion is set on the basis of a map type, a map update frequency and timing or the like. Then, in a case where the spatiotemporal map database has been updated within a predetermined time duration, the map generation unit 121 determines that data in the requested map is up to date, and the process proceeds into step S3.

Note that in a case where a desire-to-browse location is included in the map request, for example, the map generation unit 121 may determine whether data in the requested map is up to date on the basis of whether data concerning the desire-to-browse location in the spatiotemporal map database has been updated within a predetermined time duration. Moreover, in a case where desire-to-browse contents are included in the map request, for example, the map generation unit 121 may determine whether data in the requested map is up to date on the basis of whether data concerning the desire-to-browse contents in the spatiotemporal map database has been updated within a predetermined time duration.

In step S3, the map generation unit 121 generates the requested map using data registered in the spatiotemporal map database.

In step S4, the map generation unit 121 transmits map information including the generated map to the requesting client 113. In response to this, the requesting client 113 displays a map on the basis of the received map information.

Thereafter, the map providing process ends.

On the other hand, in step S2, in a case where the spatiotemporal map database has not been updated within the predetermined time duration, the map generation unit 121 determines that data in the requested map is not up to date, and the process proceeds into step S5.

In step S5, the map generation unit 121 supplies a map request to the request control unit 133, and orders collection of data.

Figure 8:
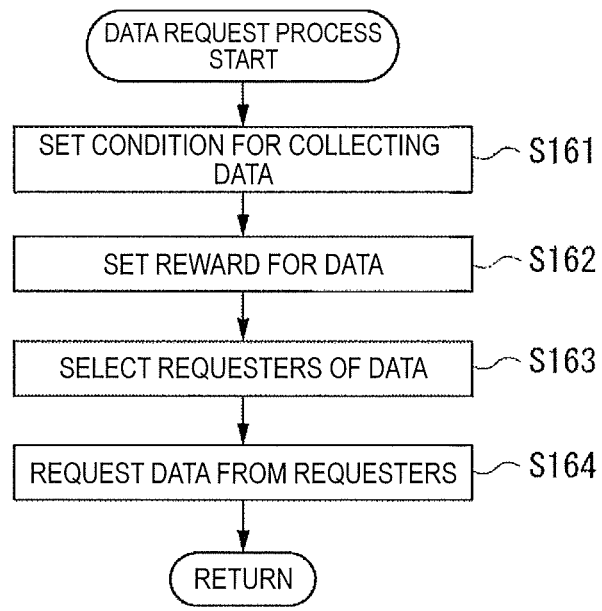
FIG. 8 is a flow chart for illustrating a data request process.

In step S6, the request control unit 133 executes a data request process. Note that although details of the data request process will be described later with reference to FIG. 8, a data acquisition unit 112 that requests data is selected through this process, and a data request is transmitted to the selected data acquisition unit 112.

Thereafter, the map providing process ends.

Note that after processing of step S6, for example, the map generation unit 121 may transmit map information including a map generated using data that is not up to date to the requesting client 113. Alternatively, after acquiring up-to-date data, the map generation unit 121 may transmit map information including a map generated using the acquired data to the requesting client 113. Alternatively, the map generation unit 121 may notify the requesting client 113 that an up-to-date map cannot be provided.

(Data Collection Control Process)

Figure 5:
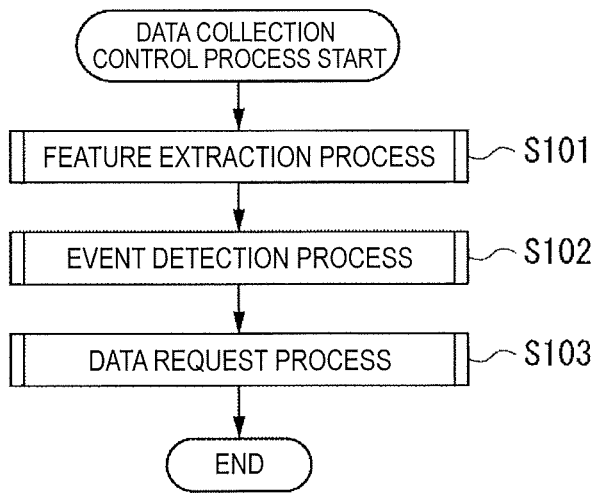
FIG. 5 is a flow chart for illustrating a data collection control process.

Next, a data collection control process executed by the server 111 will be described with reference to the flow chart of FIG. 5. Note that this process is executed at timing when the database 122 is updated, at predetermined intervals, or at any timing, for example.

Figure 6:
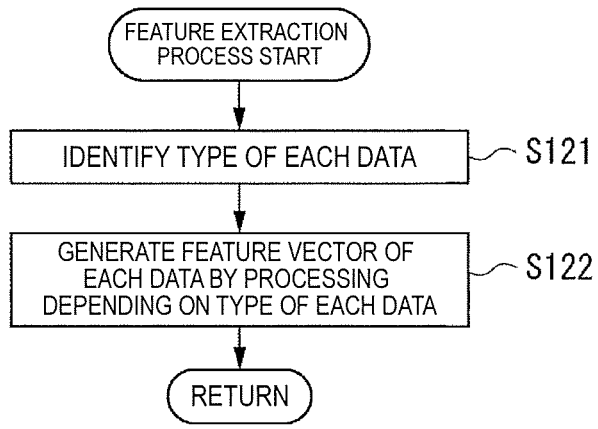
FIG. 6 is a flow chart for illustrating a feature extraction process.

In step S101, the feature extraction unit 131 executes a feature extraction process. Here, details of the feature extraction process will be described with reference to the flow chart of FIG. 6.

In step S121, the feature extraction unit 131 identifies the type of each data. Specifically, the feature extraction unit 131 identifies the type of data registered in the spatiotemporal map database within a predetermined period. Here, the predetermined period is set at, for example, a period after execution of a previous feature extraction process to the present or a period from a predetermined time before to the present or the like. Moreover, the type of data is classified into sound, text, image, other general-purpose data, and the like, for example.

In step S122, the feature extraction unit 131 generates a feature vector of each data by processing depending on the type of each data. Note that any techniques can be employed for a technique of extracting a feature quantity of each data and a technique of generating a feature vector.

For example, in a case of sound data, the feature extraction unit 131 emphasizes a frequency component which is important for human perception by Mel-frequency cepstrum coefficients (MFCC) to extract a feature quantity.

For example, in a case of text data, the feature extraction unit 131 divides the data per minimum unit having a meaning by morphological analysis, and then performs weighting taking into consideration the frequency of occurrence of morpheme in the text by term frequency/inverse document frequency (TF/IDF) to extract a feature quantity.

For example, in a case of image data, the feature extraction unit 131 extracts a feature quantity which is robust to rotation and scaling of an image, paying attention to a local intensity gradient.

Moreover, the feature extraction unit 131 subjects the feature quantity extracted by the above processing or general numeric data other than the foregoing or the like to a general-purpose feature extraction process to generate a feature vector. For example, the feature extraction unit 131 generates a histogram from the frequency of data, and on the basis of the generated histogram, generates a feature vector. Moreover, for example, the feature extraction unit 131 generates a feature vector by reducing the dimension of data using principal component analysis (PCA), singular value decomposition (SVD), probabilistic latent semantic analysis (pLSA), deep neural network (DNN), or the like. Furthermore, for example, the feature extraction unit 131 calculates various statistics such as a maximum value, a minimum value, an average value, a median value, a dispersion, and a total value, and generates a feature vector on the basis of the calculated statistics. In addition, for example, the feature extraction unit 131 performs clustering based on a distance, a density, or a graph or the like, and generates a feature vector on the basis of the result of clustering.

The feature extraction unit 131 supplies the generated feature vector of each data to the event detection unit 132.

Thereafter, the feature extraction process ends.

Figure 7:
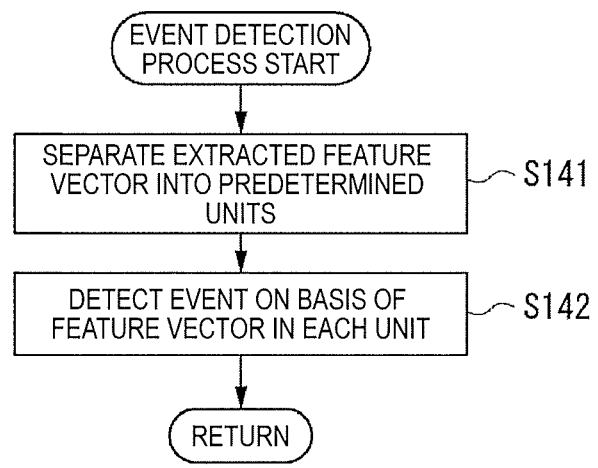
FIG. 7 is a flow chart for illustrating an event detection process.

Returning to FIG. 5, in step S102, the event detection unit 132 performs an event detection process. Here, details of the event detection process will be described with reference to the flow chart of FIG. 7.

In step S141, the event detection unit 132 separates the extracted feature vector into predetermined units. For example, the event detection unit 132 separates the extracted feature vector into predetermined units of time, such as 1 minute, 1 hour, or 1 day. Moreover, for example, the event detection unit 132 separates the extracted feature vector into predetermined units of locations, such as prefectural units, administrative district units, or units of 10 square kilometers.

In step S142, the event detection unit 132 detects an event on the basis of a feature vector in each unit. For example, the event detection unit 132 detects in which unit an event is occurring on the basis of a difference in feature vector among the respective units. Accordingly, in a case where the feature vector is separated into units of time and locations, in which location and in which time zone an event is occurring is detected.

Here, it is not easy to detect an event never having occurred in the past by supervised learning, and therefore, for example, the event detection unit 132 performs event detection using a technique for unsupervised extraordinary pattern extraction or abnormality detection. For example, a technique such as One Class support vector machine (SVM) or Local Outlier Factor is used.

In addition, the event detection unit 132 not only detects whether an event has been occurred, but even detects the contents of the event where possible.

The event detection unit 132 notifies the request control unit 133 of the result of event detection.

Thereafter, the event detection process ends.

Note that it is also possible to set the unit in which the feature vector is separated at a unit other than the above-described time and location. In a case where data is a movie viewing history, for example, the feature vector can be separated into movie categories, such as action, comedy, romance, and mystery. In this case, for example, an event such as occurrence of an unusual viewing trend in a certain category can be detected.

Note that, in the following description, a case of separating the feature vector into units of time and units of space will be described.

Returning to FIG. 5, in step S103, the request control unit 133 executes the data request process, and the data collection control process ends. Here, details of the data request process will be described with reference to the flow chart of FIG. 8.

In step S161, the condition setting unit 151 sets a condition for collecting data.

For example, in a case where a map request is supplied from the map generation unit 121 in the above-described processing of step S5 in FIG. 4 and a desire-to-browse location is included in that map request, the condition setting unit 151 sets the vicinity of the view location as a location where data is to be collected (hereinafter, referred to as a collection target location). Alternatively, in a case where an event has been detected in the above-described processing of step S142 in FIG. 7, the condition setting unit 151 sets the vicinity of the location where the event has been detected as a collection target location. Alternatively, in a case where neither specification of a desire-to-browse location or event detection has been performed, the condition setting unit 151 sets the whole space corresponding to the map as a collection target location, for example.

Moreover, for example, the condition setting unit 151 sets the contents of data to be collected on the basis of desire-to-browse contents included in the map request, the contents of the detected event, a collection target location, a time zone in which data is to be collected, and the like. Here, the data type in the spatiotemporal map database in FIG. 3 is set as the contents of data to be collected, for example, and a more detailed condition than the data type is set further as needed. The more detailed condition than the data type includes, for example, data quality (such as image quality or sound quality, for example), data accuracy, the specific contents of data, and the like. In a case of image data, for example, the specific contents of data refer to a specific subject and the like. In addition, for example, in a case where a map request is supplied from the map generation unit 121 in the above-described processing of step S5 in FIG. 4, and desire-to-browse contents are included in that map request, the condition setting unit 151 sets the desire-to-browse contents as the contents of data to be collected.

The condition setting unit 151 notifies the reward setting unit 152 and the requester selection unit 153 of the set condition.

In step S162, the reward setting unit 152 sets a reward for data. Specifically, the reward setting unit 152 sets a reward on the basis of the value of data to be collected. The value of data is set on the basis of viewpoints such as importance, rarity, urgency, and the amount of information, for example.

For example, the reward setting unit 152 sets a higher reward for data of higher importance, and sets a lower reward for data of lower importance. For example, the reward setting unit 152 estimates the number of accesses to data as a factor of importance of data, and sets a reward on the basis of the estimated value of the number of accesses. Here, an example of a method of setting a reward based on the number of accesses will be described with reference to FIG. 9.

For example, the reward setting unit 152 checks a transition of the number of accesses to data of a data type B concerning a location A set as a collection target location.

Figure 9:
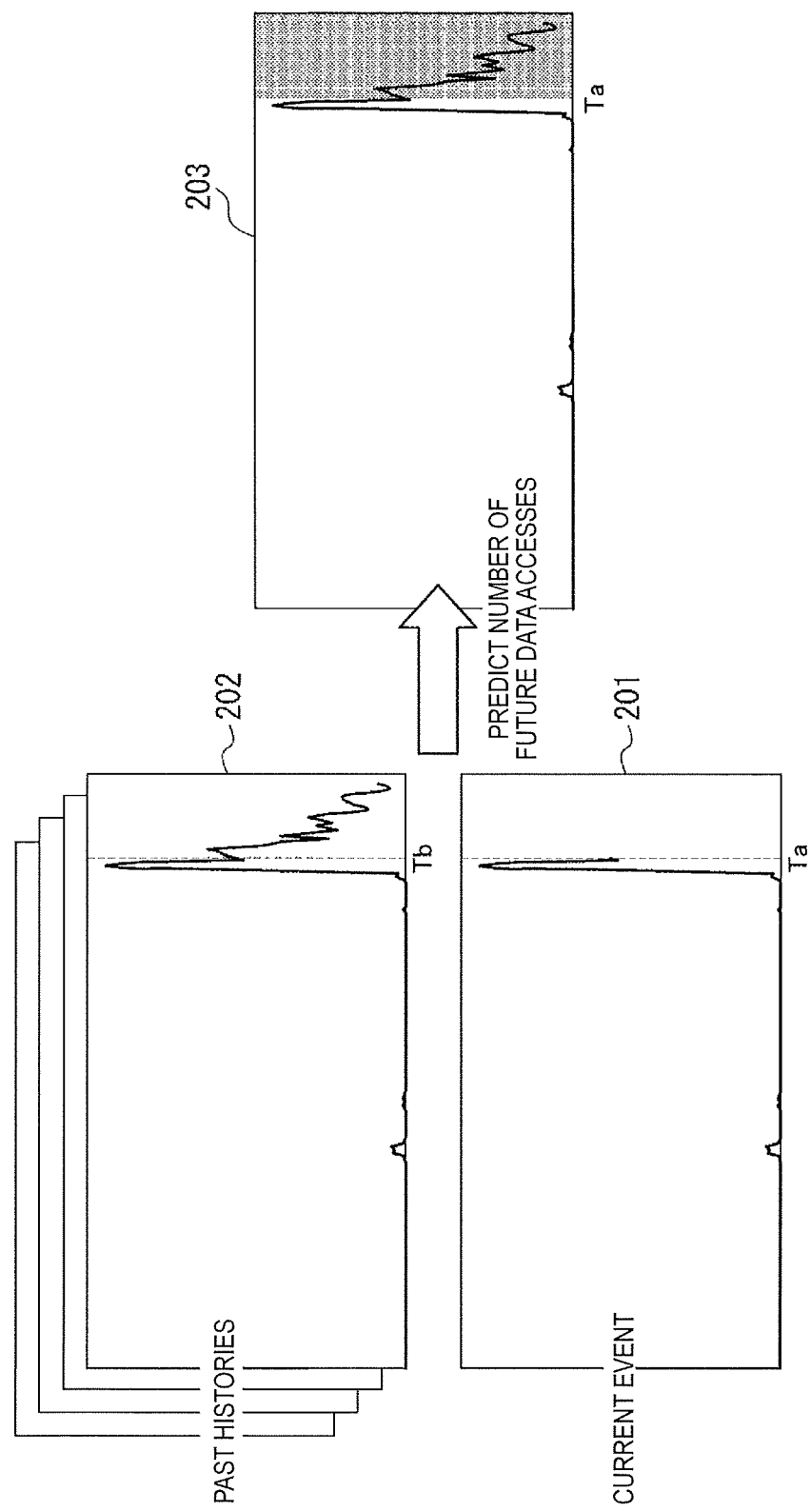
FIG. 9 is a diagram for illustrating an example of a method of estimating the number of accesses to data.

Then, the number of accesses to the data of the data type B concerning the location A is assumed to be transitioned as shown in a graph 201 in FIG. 9. Note that a time ta is the present time.

Next, the reward setting unit 152 searches for a history that resembles the transition of the number of accesses in the graph 201 through past histories of the number of accesses to the data of the data type B concerning the location A. As a result, it is assumed that a history shown in a graph 202 in FIG. 9 has been detected. A transition of the number of accesses by a time tb in the graph 202 resembles the transition of the number of accesses by the time ta in the graph 201.

Then, the reward setting unit 152 predicts that, as shown by a shaded portion in a graph 203, the number of accesses after the time ta transitions similarly to the number of accesses after the time tb in the graph 202. Accordingly, the reward setting unit 152 can estimate the number of accesses to data of the data type B concerning the location A after the time ta.

Then, the reward setting unit 152 sets a reward for data of the data type B on the basis of the estimated number of accesses. That is, the reward setting unit 152 sets a higher reward as the estimated value of the number of accesses is larger, and sets a lower reward as the estimated value of the number of accesses is larger.

Moreover, for example, the reward setting unit 152 sets a higher reward for data of higher urgency, that is, data in greater need to be collected urgently and presented to a user. On the other hand, the reward control unit 152 sets a lower reward for data of lower urgency, that is, data in less need to be collected urgently and presented to a user.

Furthermore, for example, the reward setting unit 152 sets a higher reward for data of higher rarity, and sets a lower reward for data of lower rarity. Here, data of higher rarity refers to, for example, data that is not easily collected, data that can be acquired by a smaller number of data acquisition units 112, data expected to be provided in a smaller number of pieces, or the like. In contrast, data of lower rarity refers to, for example, data that is easily collected, data that can be acquired by a larger number of data acquisition units 112, data expected to be provided in a larger number of pieces, or the like.

In addition, for example, the reward setting unit 152 sets a higher reward for data containing a larger amount of information, and sets a lower reward for data containing a smaller amount of information. For example, the reward setting unit 152 sets a higher reward for image data having higher image quality than image data having lower image quality. In addition, for example, the reward setting unit 152 sets a higher reward for image data than for sound data.

Note that the reward setting unit 152 may set a reward by combining a plurality of viewpoints. Alternatively, the reward setting unit 152 may set a reward on the basis of another viewpoint. Further, the reward setting unit 152 may, for example, perform machine learning using a technique such as linear regression or multiple regression to generate a model for estimating the value of data, and set a reward using the generated model.

Moreover, the reward setting unit 152 may, for example, set the upper limit of a reward that can be provided, and distribute the reward depending on the number of providers.

Furthermore, it is possible to set the reward at any contents such as cash, a point, a bonus, or an evaluation, for example.

The reward setting unit 152 notifies the data request unit 154 of the set reward.

In step S163, the requester selection unit 153 selects requesters of data on the basis of at least one of a context and a profile of each of the data acquisition units 112 as well as the contents of requested data.

Here, in the context of a data acquisition unit 112, a current position, an operating condition, and the like of the data acquisition unit 112 are included, for example. Moreover, in the context of the data acquisition unit 112 of the manual type, a context of an owner is included. In the context of the owner, a current position, the contents of a current activity, and the like are included, for example.

Furthermore, in the profile of the data acquisition unit 112, the type, specifications, performance, a function, and the like of the data acquisition unit 112 are included, for example. In addition, in the profile of the data acquisition unit 112 of the manual type, a profile of an owner is included. In the profile of the owner, information such as a preference, an activity pattern, and a history of providing data in the past of the owner is included.

Specifically, the requester selection unit 153 searches for a data acquisition unit 112 capable of acquiring data that satisfies the condition set in the processing of step S161, and selects the detected data acquisition unit 112 as a requester candidate. For example, the requester selection unit 153 sets the data acquisition unit 112 of the semi-automatic, passive, or manual type that is present in the vicinity of the collection target location set in the processing of step S161 and is capable of acquiring data of the contents set in the processing of step S161, as a requester candidate.

Then, the requester selection unit 153 selects as requesters all or part of the data acquisition units 112 of the semi-automatic and passive types from among requester candidates.

Moreover, as to the data acquisition unit 112 of the manual type, the requester selection unit 153 selects a requester from among requester candidates on the basis of a history of providing data in the past, a context and a profile of an owner, and the like, as described below, for example.

That is, the requester selection unit 153 searches for data acquisition units 112 having track records of providing data of the same contents or data concerning the vicinity of the same location in the past through the data acquisition units 112 of the manual type which are requester candidates. Then, the requester selection unit 153 selects all or part of the detected data acquisition units 112 as requesters. In a case of selecting part of the detected data acquisition units 112 as requesters, the requester selection unit 153 selects as requesters a top predetermined number of the data acquisition units 112 in descending order of the number of provision track records, for example. Alternatively, the requester selection unit 153 selects requesters at random from among the data acquisition units 112 having provision track records.

Moreover, in a case where there are few data acquisition units 112 of the manual type having provision track records among requester candidates, the requester selection unit 153 may select as requesters all or part of the data acquisition units 112 of the manual type having no provision track record from among requester candidates. For example, the requester selection unit 153 detects owners who resemble owners of the data acquisition units 112 of the manual type having provision track records from among owners of the data acquisition units 112 of the manual type having no provision track record, using a technique such as collaborative filtering. Then, the requester selection unit 153 selects the data acquisition units 112 of the detected owners as requesters. Alternatively, for example, the requester selection unit 153 selects requesters at random from among the data acquisition units 112 of the manual type having no provision track record.

Furthermore, for example, the requester selection unit 153 selects as requesters by priority the data acquisition units 112 that are highly likely to provide data from among the data acquisition units 112 of the manual type which are requester candidates. For example, the requester selection unit 153 estimates the likelihood that the owner of each requester selection unit 153 provides data, and on the basis of the estimated result, selects the data acquisition units 112 of owners who are highly likely to provide data as requesters by priority.

Note that the likelihood that the owner provides data is estimated on the basis of data supplied from the data acquisition unit 112, the contents of requested data, the type of the data acquisition unit 112, a collection target location, a time zone in which data is collected, or the like. For example, the requester selection unit 153 detects the context of the owner of the data acquisition unit 112 on the basis of data from the data acquisition unit 112. Then, in a case where the owner is walking in the vicinity of the collection target location, for example, the requester selection unit 153 estimates that the likelihood of providing data is high, and in a case where the owner is working or driving, estimates that the likelihood of providing data is low. Moreover, in a case where the owner is in a vehicle, for example, the requester selection unit 153 estimates that the likelihood of providing data is low if the owner is sitting on the driver's seat, and estimates that the likelihood of providing data is high if the owner is sitting on a seat other than the driver's seat.

Then, the requester selection unit 153 notifies the data request unit 154 of the result of requester selection.

In step S164, the data request unit 154 requests data from requesters, and the data request process ends. Specifically, the data request unit 154 generates a data request including the contents of requested data and a reward or the like. The data request unit 154 transmits the generated data request to the data acquisition units 112 selected as requesters. Accordingly, the requesters are informed of the contents of requested data and the reward.

Figure 10:
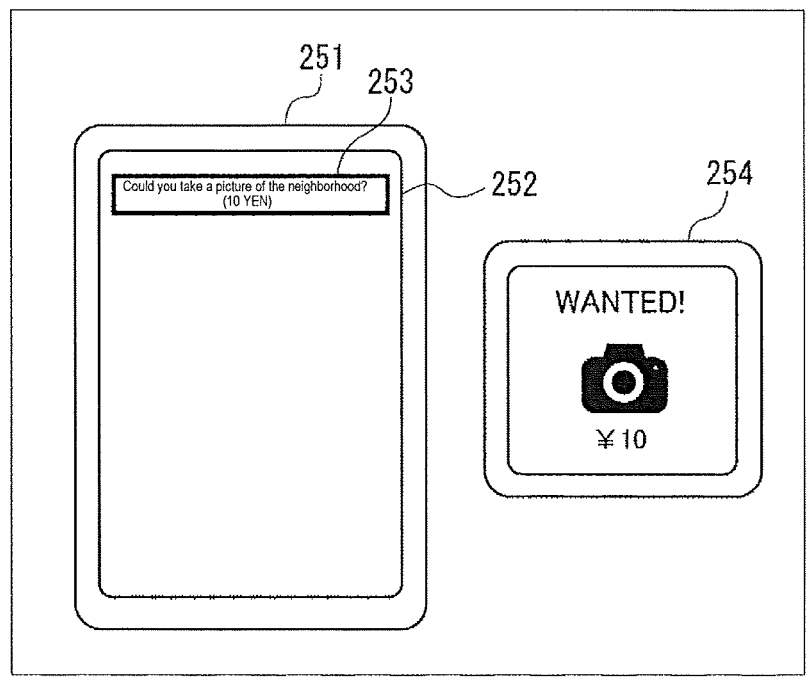
FIG. 10 is a diagram showing an example of a screen displayed in a case where a data request has been received.

FIG. 10 shows an example of a screen 252 displayed in a case where a smartphone 251 which is a form of the data acquisition unit 112 of the manual type has received a data request from the server 111. In the screen 252, a message that requests to take a picture of the neighborhood and a window 253 showing 10 yen which is a reward therefor are displayed.

Moreover, a window 254 shown on the right side may be displayed in the screen 252 instead of the window 253. In the window 254, a message that requests to take a picture and an icon, as well as 10 yen which is a reward therefor are displayed.

For example, an owner of the smartphone 251 looks at the window 253 or the window 254, takes a picture of the neighborhood with the smartphone 251, and transmits the taken picture to the server 111. Note that the owner may take a picture with a device, such as a digital camera, other than the smartphone 251, and transmit the picture to the server 111.

Figure 11:
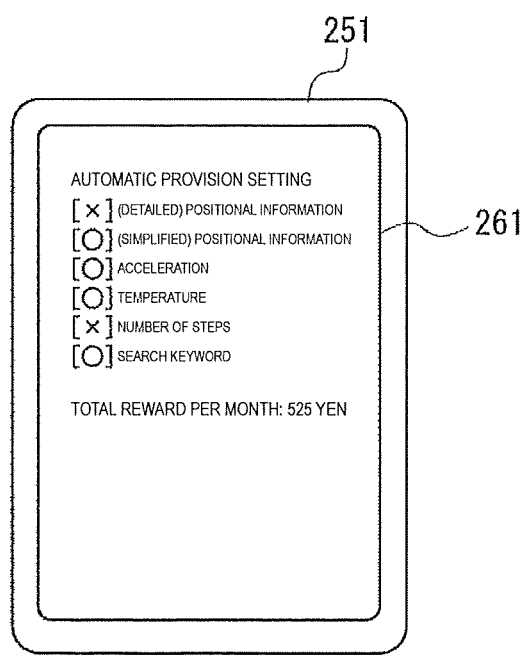
FIG. 11 is a diagram showing an example of a setting screen.

On the other hand, FIG. 11 shows an example of a setting screen 261 in a case of using the smartphone 251 as the data acquisition unit 112 of the automatic type. On the setting screen 261, a menu for selecting the type of data to be acquired automatically and provided to the server 111 is displayed. In this example, (detailed) positional information, (simplified) positional information, an acceleration, a temperature, the number of steps, a search keyword are included in options. Then, the owner selects the type of data to be provided automatically by entering a circle or x in brackets on the left side of each option. In this example, an example is shown in which (simplified) positional information, an acceleration, a temperature, and a search keyword have been selected as data to be provided automatically, and (detailed) positional information and the number of steps have not been selected as data to be provided automatically.

Moreover, a reward for automatically providing the selected data is displayed under the menu. In this example, it is shown that the reward is 525 yen per month. Note that this reward varies depending on a combination of selected data.

Note that the server 111 may transmit the same data request to a plurality of data acquisition units 112 and accept provision of data in an auction format. In a case of the auction format, for example, the server 111 employs the first provided data, or employs data that best matches a condition.

(Data Registration Process)

Figure 12:
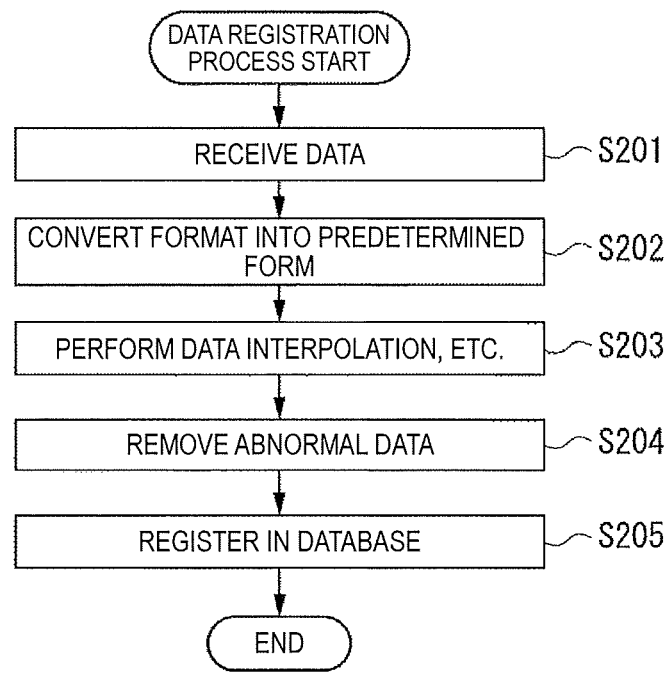
FIG. 12 is a flow chart for illustrating a data registration process.

Next, a data registration process executed by the server 111 will be described with reference to the flow chart of FIG. 12. This process is started when data is transmitted from the data acquisition unit 112, for example. Note that this process is executed not only when data is transmitted from the data acquisition unit 112 in response to a data request, but also when data is transmitted automatically.

In step S201, the data registration unit 124 receives data transmitted from the data acquisition unit 112.

In step S202, the data registration unit 124 converts the format into a predetermined form. That is, the data registration unit 124 converts the format of received data to be in conformity with the form of the spatiotemporal map database depending on the data type.

In step S203, the data registration unit 124 performs data interpolation and the like as needed. For example, in a case where received data is time-series data, the data registration unit 124 interpolates data at a time between adjacent measurement times using linear interpolation or the like.

In step S204, the data registration unit 124 removes abnormal data. For example, the data registration unit 124 removes data having an abnormal value or defective data in accordance with a predetermined rule or the like.

In step S205, the data registration unit 124 registers data in the database 122 (spatiotemporal map database) except for the data excluded in the processing of step S104. Then, a spatiotemporal map is generated in the above-described map generation process using the registered data.

Thereafter, the data registration process ends.

2. Use Cases

Next, use cases of the present technology will be described with reference to FIG. 13 to FIG. 19.

{Traffic Abnormality Map}

First, a case of providing a traffic abnormality map 301 using the present technology will be described with reference to FIG. 13 and FIG. 14.

Figure 13:
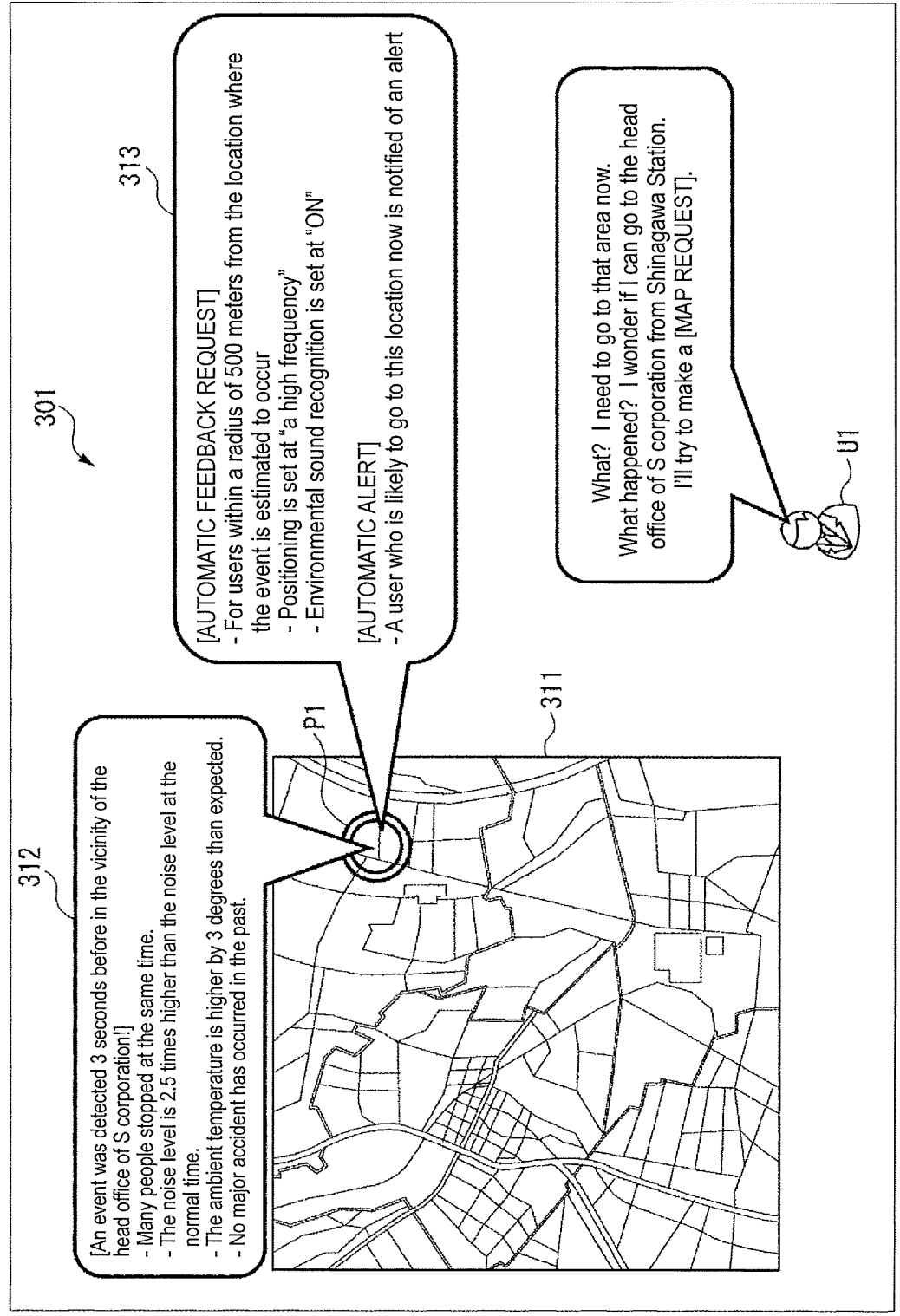
FIG. 13 is a diagram for illustrating a use case in a case of providing a traffic abnormality map using the present technology.

FIG. 13 shows an example in which an event has been detected in a location P1 on a map 311 in the traffic abnormality map 301. In a bubble 312, the specific contents of the event at this point of time are shown. Specifically, it is shown that an event was detected 3 seconds before in the vicinity of the head office of S corporation situated in the location P1. It is also shown that many people have stopped in the location P1, the noise level is 2.5 times higher than the noise level at the normal time, the temperature is higher by 3 degrees than expected, and no major accident has occurred in the past.

The server 111 sets the contents of data to be acquired in response to detection of this event, and transmits a data request to a data acquisition unit 112 capable of acquiring data of the set contents with respect to the location P1. For example, as shown in a bubble 313, a request is made to a data acquisition unit 112 of the semi-automatic or passive type in the vicinity of the location P1 to set the frequency of positioning the current location at a high frequency and turn on environmental sound recognition. Moreover, for example, a data request is transmitted to a data acquisition unit 112 of the manual type in the vicinity of the location P1 or expected to move to the vicinity of the location P1 now.

Moreover, as shown in the bubble 313, the server 111 notifies a client 113 expected to move to the vicinity of the location P1 now of an alert. In response to this, a user U1 having the client 113 which has been notified of the alert transmits a map request since he/she needs to go to the vicinity of the location P1.

Figure 14:
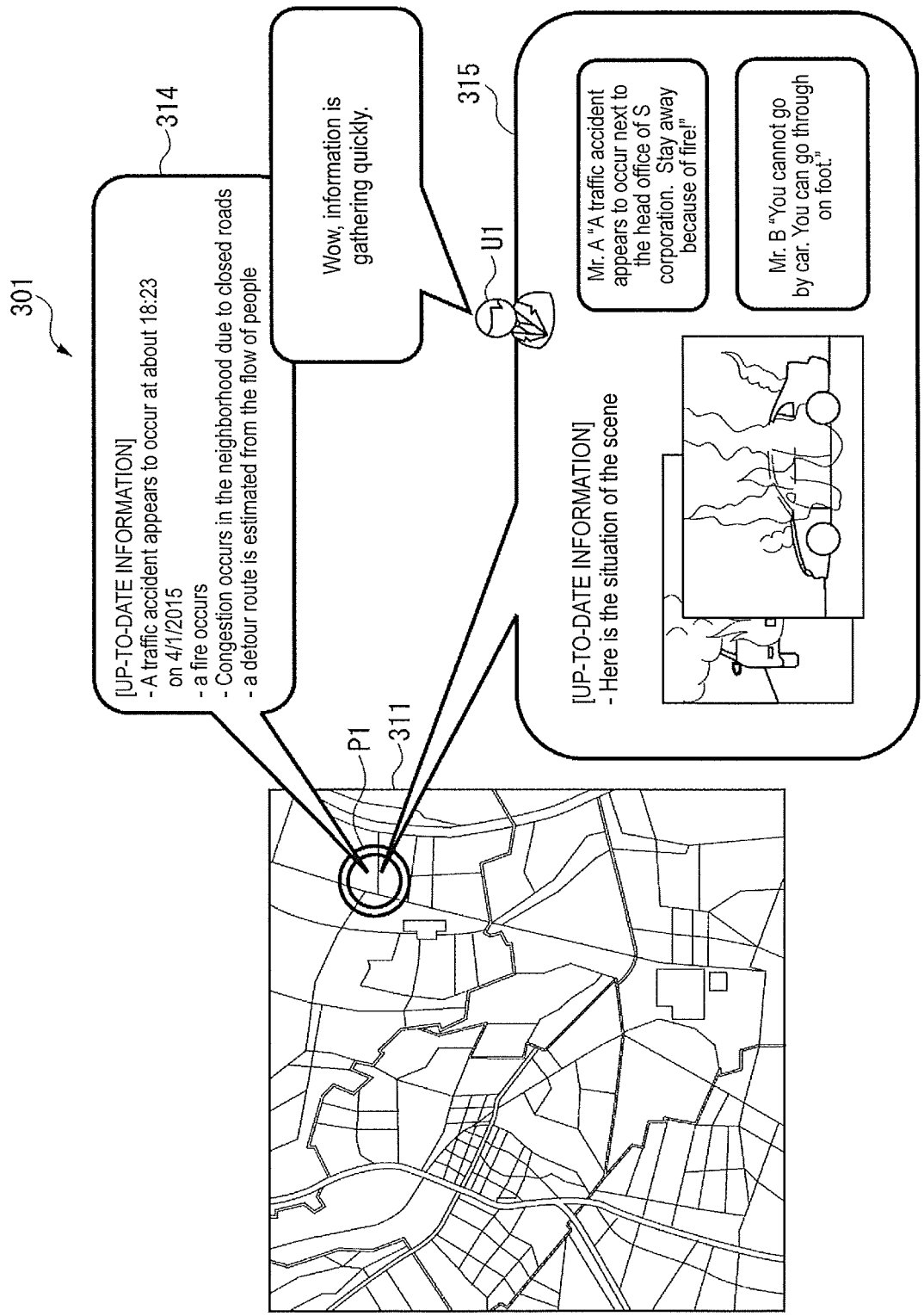
FIG. 14 is a diagram for illustrating a use case in a case of providing a traffic abnormality map using the present technology.

Thereafter, as shown in FIG. 14, up-to-date data on the vicinity of the location P1 is transmitted successively from the data acquisition unit 112 having received the data request to the server 111, and the user U1 can quickly learn up-to-date information on the vicinity of the location P1 in detail. For example, it is shown in a bubble 314 that a traffic accident appears to occur in the location P1, together with the time of occurrence. Moreover, it is shown that a fire occurs, and the road is closed, so that congestion is occurring in the neighborhood. Furthermore, it is shown that the flow of people has been detected on the basis of a change in the current location notified from the data acquisition unit 112, and as a result, the server 111 has estimated a detour route.

In addition, in a bubble 315, an image showing the situation of the scene, messages, and the like provided from the data acquisition unit 112 having received the data request are displayed.

{Agricultural Land Monitoring Map}

Next, a case of providing an agricultural land monitoring map 351 using the present technology will be described with reference to FIG. 15.

Figure 15:
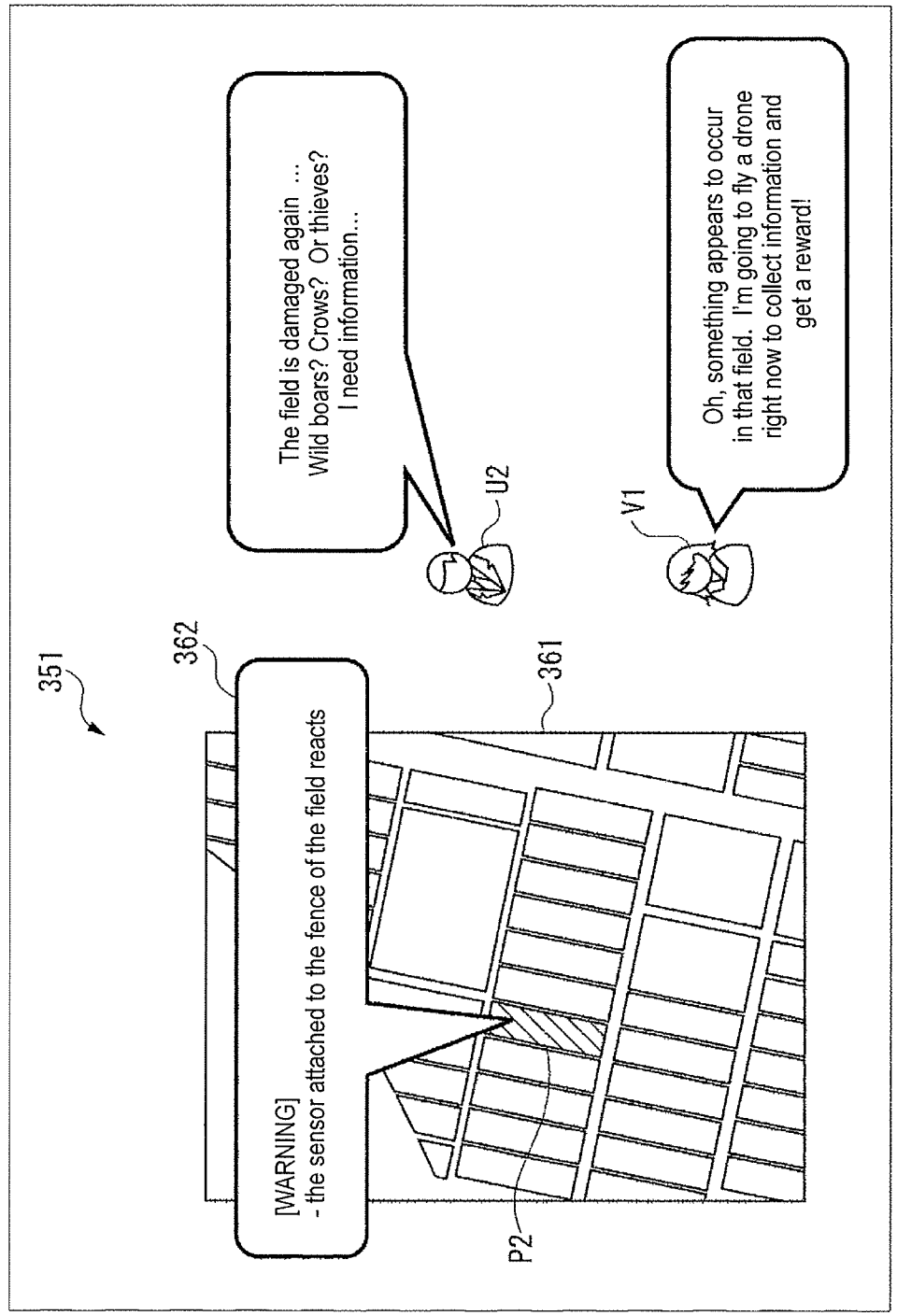
FIG. 15 is a diagram for illustrating a use case in a case of providing an agricultural land monitoring map using the present technology.

In FIG. 15, an example in which an event has been detected in a location P2 on a map 361 in the agricultural land monitoring map 351 is shown. In a bubble 362, it is shown that a sensor attached to a fence in a field in the location P2 reacts.

The server 111 sets the contents of data to be acquired in response to detection of this event, and transmits a data request to a data acquisition unit 112 capable of acquiring data of the set contents with respect to the location P2. At this time, a data request is transmitted not only to a data acquisition unit 112 present in the vicinity of the location P2 and a data acquisition unit 112 predicted to move to the vicinity of the location P2 now, but also to a data acquisition unit 112 of an owner who has means for acquiring data in the vicinity of the location P2 (such as a drone, for example).

In response to this, an owner V1 having the data acquisition unit 112 to which the data request has been transmitted acquires data concerning the field in the location P2 using a drone, and transmits the data to the server 111. As a result, a user U2 who is an owner of the field in the location P2 can learn the current status of his/her own field quickly and in detail.

{Contents Viewing Map}

Next, a case of providing a contents viewing map 401 using the present technology will be described with reference to FIG. 16 and FIG. 17.

Figure 16:
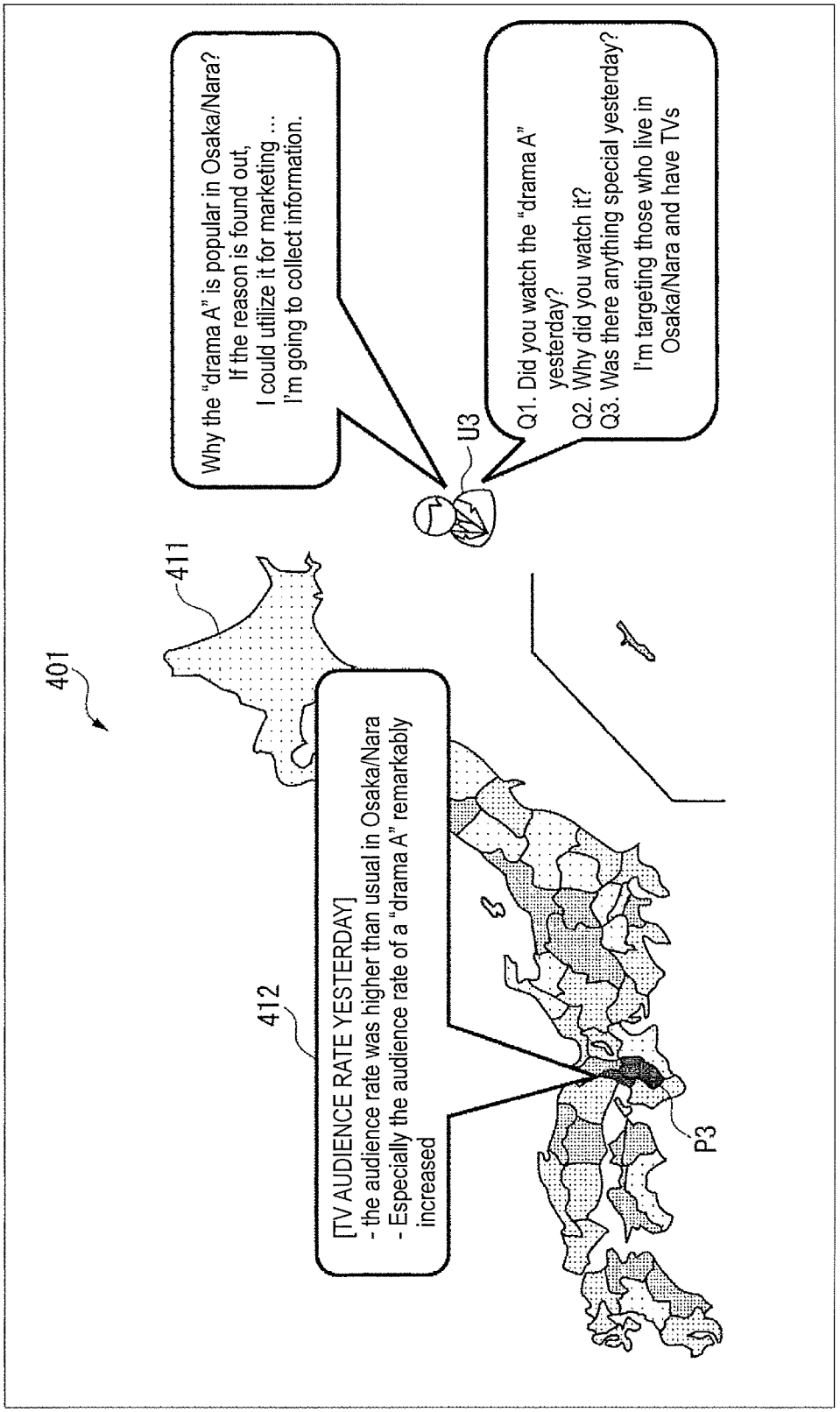
FIG. 16 is a diagram for illustrating a use case in a case of providing a contents viewing map using the present technology.
Figure 17:
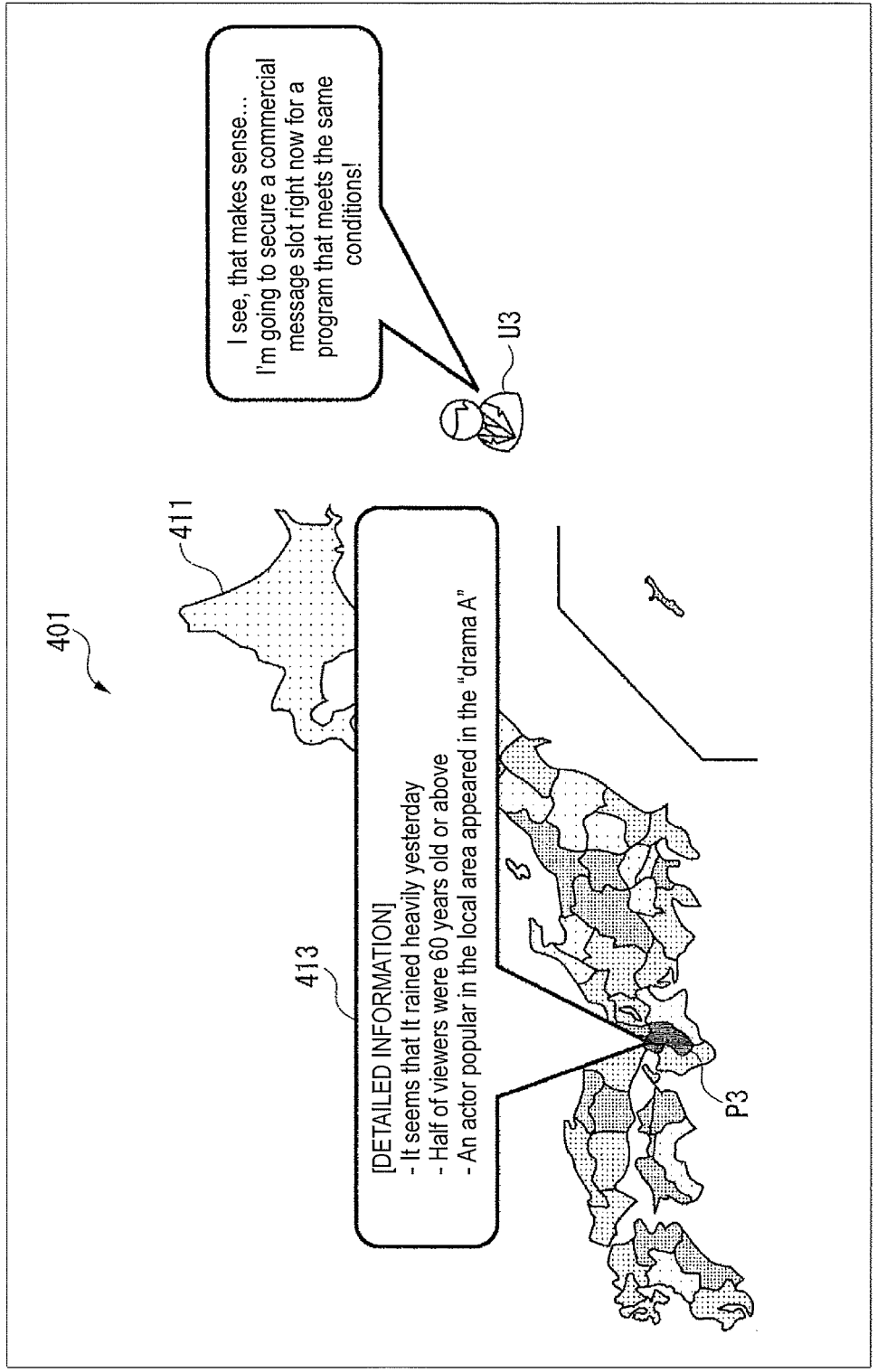
FIG. 17 is a diagram for illustrating a use case in a case of providing a contents viewing map using the present technology.

In FIG. 16, an example of the contents viewing map 401 including a Japanese map 411 showing a distribution of the TV audience rate yesterday in each prefecture is shown. Then, in a bubble 412, information that the audience rate was higher than usual in Osaka and Nara and that especially the audience rate of a drama A remarkably increased is shown. That is, in this case, it has been detected as an event that the audience rate of the drama A was high in a location P3 including Osaka and Nara.

A user U3 having seen this contents viewing map 401 desires to learn the reason why the drama A is popular in Osaka and Nara and to utilize the reason for marketing. Therefore, the user U3 specifies Osaka and Nara as desire-to-browse locations, and transmits a map request in which questions Q1 to Q3 have been specified as desire-to-browse contents to the server 111. The question Q1 is "Did you watch the drama A yesterday?", the question Q2 is "Why did you watch the drama A?", and the question Q3 is "Was there anything special yesterday?".

In response to this, the server 111 transmits a data request to a data acquisition unit 112 of an owner who lives in Osaka or Nara and is highly likely to answer the questions Q1 to Q3, for example. The owner of the data acquisition unit 112 having received the data request transmits answers to the questions Q1 to Q3 to the server 111. This allows the server 111 to present the reason why the audience rate of the drama A was high in Osaka and Nara to the user U3, as shown in a bubble 413 in FIG. 17. Specifically, that it rained heavily yesterday, half of viewers are 60 years old or above, and an actor popular in the local area (Osaka and Nara) appeared in the drama A are listed as the reasons why the audience rate of the drama A was high in Osaka and Nara.

Then, the user U3 can use the obtained information to quickly perform actions such as securing a commercial message slot and utilizing the information for marketing.

{Tourist Spot Map}

Next, a case of providing a tourist spot map 451 using the present technology will be described with reference to FIG. 18 and FIG. 19.

Figure 18:
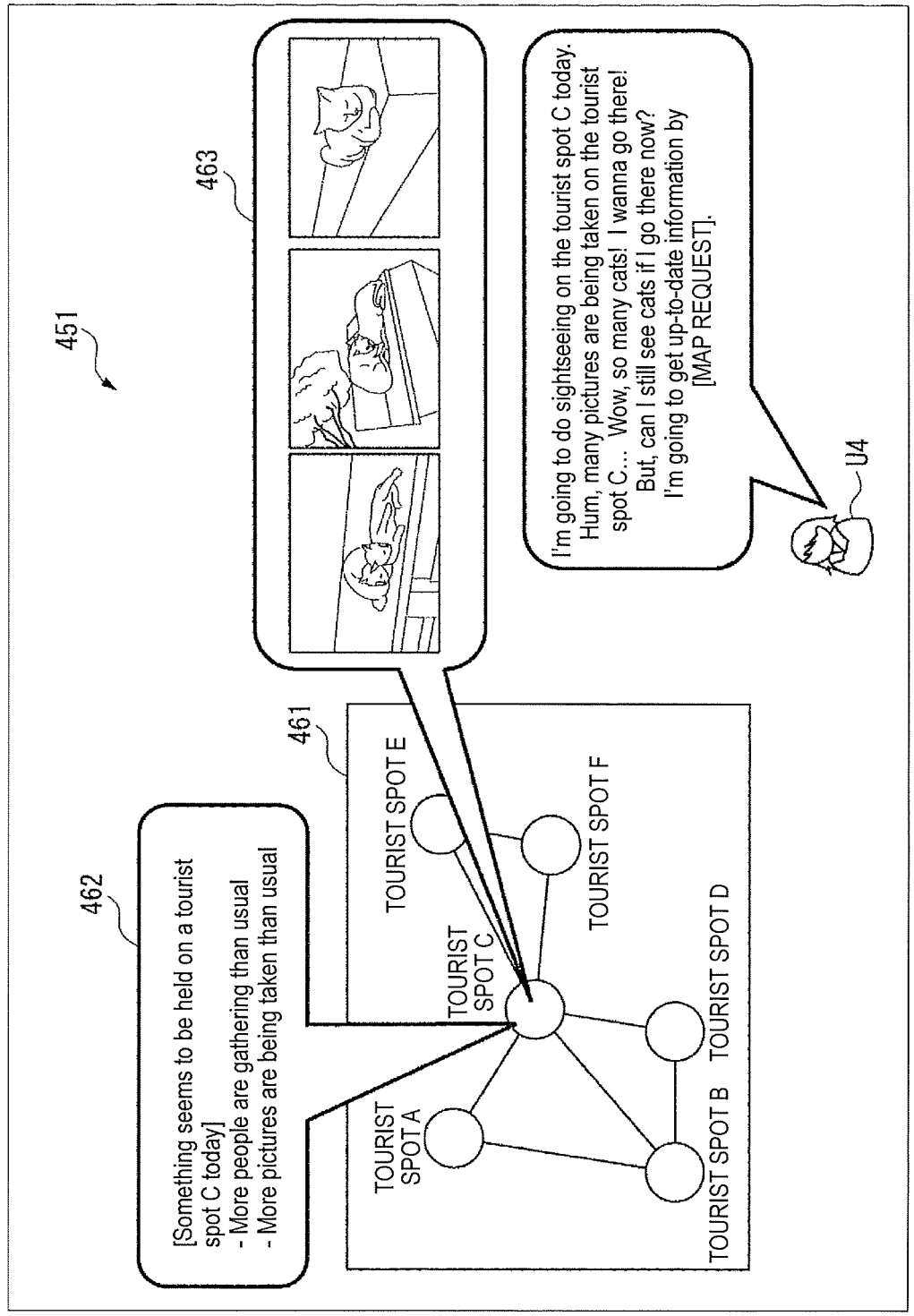
FIG. 18 is a diagram for illustrating a use case in a case of providing a tourist spot map using the present technology.
Figure 19:
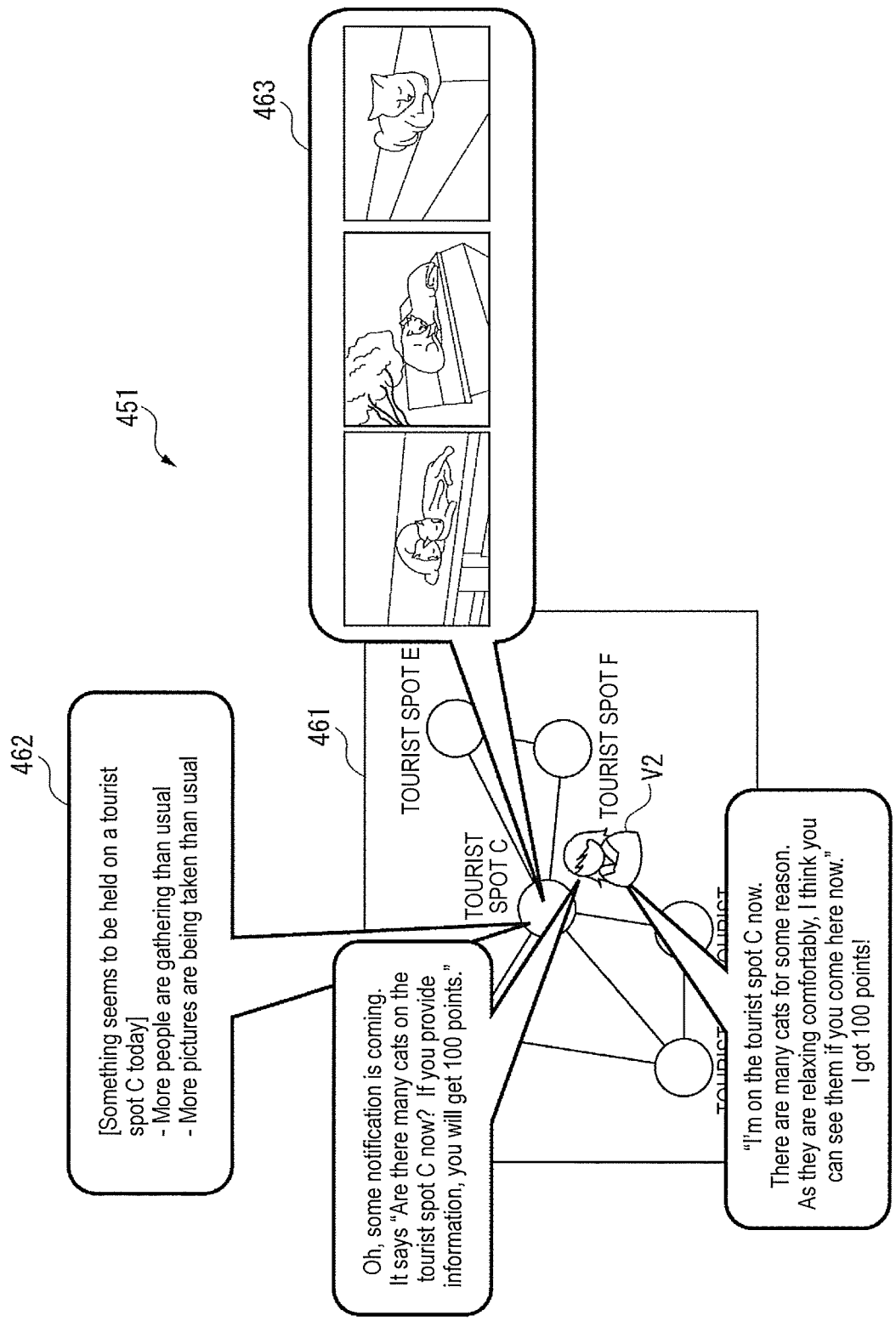
FIG. 19 is a diagram for illustrating a use case in a case of providing a tourist spot map using the present technology.

In FIG. 18, an example in which some event has been detected on a tourist spot C on a map 461 in the tourist spot map 451 is shown. In a bubble 462, it is shown that more people are gathering than usual on the tourist spot C and many pictures are being taken. Moreover, pictures taken on the tourist spot C are displayed in a bubble 463, and cats appear in those pictures.

Then, a user U4 who considers sightseeing the tourist spot C browses the tourist spot map 451 in order to obtain information on the tourist spot C. Then, the user U4 learns that many pictures of cats are being taken on the tourist spot C, and transmits a map request to the server 111 wishing to learn whether there will be cats if he/she visits there now. At this time, the user U4 specifies the tourist spot C as a desire-to-browse location, and specifies that he/she desires to learn whether there are still many cats on the tourist spot C as desire-to-browse contents. Moreover, the user U4 sets a reward for data provision at 100 points.

The server 111 transmits a data request to a data acquisition unit 112 of an owner who is present in the vicinity of the tourist spot C, for example. In this data request, a need for information as to whether there are many cats on the tourist spot C and an offer of 100 points as the reward therefor are shown.

In response to this, an owner V2 of a data acquisition unit 112 having received the data request transmits text data including information that there are still many cats on the tourist spot C and it will not be too late to the server 111. Accordingly, the owner V2 can acquire 100 points as the reward.

Moreover, the user U4 can also quickly learn that there are still many cats on the tourist spot C. Then, the user U4 can see many cats by going to the tourist spot C immediately.

As described above, according to the present technology, it is possible to utilize the data acquisition unit 112 effectively to generate various spatiotemporal maps efficiently for provision to a user.

Specifically, a location or time zone in which data changes on a spatiotemporal map is usually limited, and data hardly changes in most of locations and time zones. In addition, a location on a spatiotemporal map at which a user looks is usually concentrated on a specific location. Therefore, it is not always necessary to acquire and update data on all the locations on a spatiotemporal map with the same accuracy and frequency.

In contrast, the server 111 can collect necessary data efficiently by transmitting a data request to a data acquisition unit 112 capable of acquiring data concerning a location in which some change occurs or a location at which a user desires to look.

Moreover, the server 111 can change a requester of data according to circumstances. Therefore, the server 111 can flexibly deal with provision of a new type of spatiotemporal map, change of the specification of an existing spatiotemporal map, and the like, without installing a new sensor or the like.

Furthermore, generally as the amount of information of data increases and as data accuracy or flexibility increases, costs necessary for acquiring data increase. For example, consumption power of an image sensor that acquires image data is larger than a microphone that acquires sound data. In addition, as compared with character recognition with a machine such as OCR, human data recognition requires higher costs because of personnel cost and the like.

In contrast, it is not always necessary to provide a dedicated data acquisition unit 112 in the information processing system 101, but a data acquisition unit 112 that can acquire necessary data when data is necessary can be used. Therefore, a spatiotemporal map can be generated at low costs.

Moreover, for example, a smartphone which is a form of the data acquisition unit 112 has a large number of sensors, and most of data acquired by these sensors is discarded without being used. In contrast, the information processing system 101 can effectively utilize data that would be discarded without being used in the data acquisition unit 112 to generate a spatiotemporal map. Furthermore, an owner of the data acquisition unit 112 can effectively utilize data acquired by the data acquisition unit 112 to obtain a reward.

3. Variants

Hereinafter, variants of the above-described embodiment of the present technology will be described.

The examples of setting a reward for data have been shown in the above description, whilst it is not necessary to set a reward.

Moreover, for example, each data acquisition unit 112 may perform event detection, and may inform the result of event detection to the server 111. In addition, in this case, each data acquisition unit 112 may automatically transmit data to the server 111 in a case where an event has been detected.

Furthermore, for example, a condition for collecting data may be transmitted from the server 111 to each data acquisition unit 112 for the data acquisition unit 112 to determine whether data that satisfies that condition can be acquired. Then, in a case where it is determined that data can be acquired, the data acquisition unit 112 may acquire data that satisfies the condition and transmit the data to the server 111.

In addition, for example, each data acquisition unit 112 of the manual type may detect a context of each owner, and may notify the server 111 of the detection result.

{Configuration Example of Computer}

The series of processes described above can be executed by hardware but can also be executed by software. When the series of processes is executed by software, a program that constructs such software is installed into a computer. Here, the expression "computer" includes a computer in which dedicated hardware is incorporated and a general-purpose personal computer or the like that is capable of executing various functions when various programs are installed.

Figure 20:
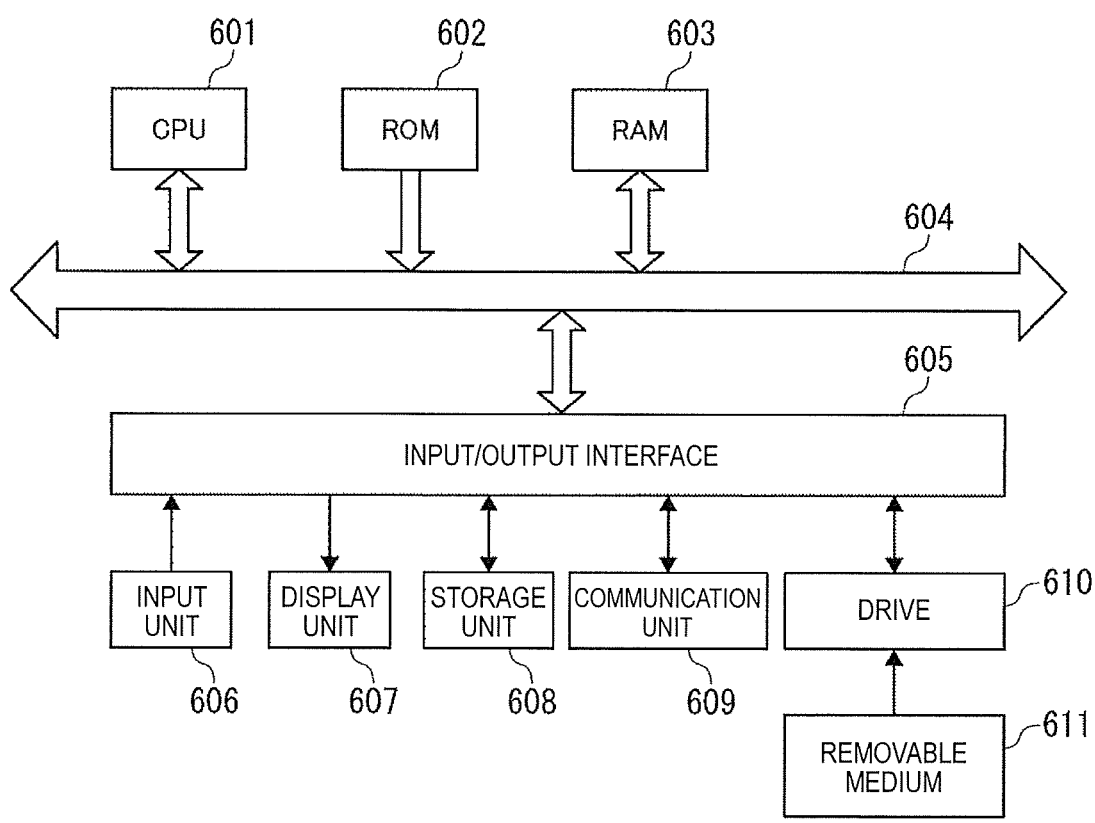
FIG. 20 is a block diagram showing a configuration example of a computer.

FIG. 20 is a block diagram showing an example configuration of the hardware of a computer that executes the series of processes described earlier according to a program.

In the computer, a CPU (Central Processing Unit) 601, a ROM 602, and a RAM 603 are connected to each other through a bus 604.

An input/output interface 605 is also connected to the bus 604. An input unit 606, an output unit 607, a storage unit 608, a communication unit 609, and a drive 610 are connected to the input/output interface 605.

The input unit 606 is configured from a keyboard, a mouse, a microphone or the like. The output unit 607 is configured from a display, a speaker or the like. The storage unit 608 is configured from a hard disk, a non-volatile memory or the like. The communication unit 609 is configured from a network interface or the like. The drive 610 drives a removable medium 611 such as a magnetic disk, an optical disk, a magneto-optical disk, a semiconductor memory or the like.

In the computer configured as described above, as one example the CPU 601 loads a program stored in the storage unit 608 via the input/output interface 605 and the bus 604 into the RAM 603 and executes the program to carry out the series of processes described earlier.

As one example, the program executed by the computer (the CPU 601) may be provided by being recorded on the removable medium 611 as a packaged medium or the like. The program can also be provided via a wired or wireless transfer medium, such as a local area network, the Internet, or a digital satellite broadcast.

In the computer, by loading the removable medium 611 into the drive 610, the program can be installed into the storage unit 608 via the input/output interface 605. It is also possible to receive the program from a wired or wireless transfer medium using the communication unit 609 and install the program into the storage unit 608. As another alternative, the program can be installed in advance into the ROM 602 or the storage unit 608.

Note that the program executed by the computer may be a program in which processes are carried out in a time series in the order described in this specification or may be a program in which processes are carried out in parallel or at necessary timing, such as when the processes are called.

Further, in the present specification, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a single apparatus having a plurality of modules stored within a single casing.

An embodiment of the present technology is not limited to the embodiment described above, and various changes may be made without departing from the scope of the present technology.

For example, the present technology can adopt a configuration of cloud computing which processes by allocating and connecting one function by a plurality of apparatuses through a network.

Further, each step described by the above mentioned flow charts can be executed by one apparatus or by allocating a plurality of apparatuses.

In addition, in the case where a plurality of processes is included in one step, the plurality of processes included in this one step can be executed by one apparatus or by allocating a plurality of apparatuses.

The effects described in this specification are merely examples and are not limited, and other effects may be exerted.

An embodiment of the present technology is not limited to the embodiment described above, and various changes may be made without departing from the scope of the present technology.

Further, for example, the present technology may also be configured as below.

(1)

An information processing device including:

a requester selection unit configured to select a requester of data concerning a certain location on a spatiotemporal map in which data changes with time from among a plurality of data acquisition units on the basis of at least one of contexts and profiles of the data acquisition units as well as contents of requested data;

a data requesting unit configured to request data from the requester; and a map generation unit configured to generate the spatiotemporal map using data from the requester.

(2)

The information processing device according to (1), in which the contexts of the data acquisition units include contexts of users who use the data acquisition units, and the request selection unit estimates likelihoods that the users provide data concerning the certain location on the basis of the contexts of the users, and selects the requester on the basis of an estimated result.

(3)

The information processing device according to (1) or (2), in which the profiles of the data acquisition units include past track records of providing data of users who use the data acquisition units, and the request selection unit selects the requester on the basis of the past track records of providing data of the users.

(4)

The information processing device according to any of (1) to (3), further including:

an event detection unit configured to detect an event in a space corresponding to the spatiotemporal map on the basis of data from a plurality of the data acquisition units, in which the requester selection unit selects a requester of data concerning a vicinity of a location in which the event has been detected.

(5)

The information processing device according to any of (1) to (4), in which the requester selection unit selects a requester of data concerning a vicinity of a location specified by a user who uses the spatiotemporal map.

(6)

The information processing device according to any of (1) to (5), further including:

a reward setting unit configured to set a reward for data on the basis of a value of requested data, in which the data requesting unit notifies the requester of a set reward.

(7)

The information processing device according to (6), in which the reward setting unit sets the reward on the basis of an estimated value of the number of accesses to the requested data.

(8)

The information processing device according to any of (1) to (7), further including:

a condition setting unit configured to set a condition for collecting data, in which the requester selection unit selects the requester from among the data acquisition units capable of acquiring data that satisfies the set condition.

(9)

An information processing method including:

a requester selection step of selecting a requester of data concerning a certain location on a spatiotemporal map in which data changes with time from among a plurality of data acquisition units on the basis of at least one of contexts and profiles of the data acquisition units as well as contents of requested data;

a data requesting step of requesting data from the requester; and a map generation step of generating the spatiotemporal map using data from the requester.

(10)

A program for causing a computer to execute a process including a requester selection step of selecting a requester of data concerning a certain location on a spatiotemporal map in which data changes with time from among a plurality of data acquisition units on the basis of at least one of contexts and profiles of the data acquisition units as well as contents of requested data, a data requesting step of requesting data from the requester, and a map generation step of generating the spatiotemporal map using data from the requester.

REFERENCE SIGNS LIST 101 information processing system
111 server
112-1 to 112-*m* data acquisition unit
113-1 to 113-*n* client
121 map generation unit
122 database
123 data collection control unit
124 data registration unit
131 character extraction unit
132 event detection unit
133 request control unit
151 condition setting unit
152 reward setting unit
153 requester selection unit
154 data requesting unit

The invention claimed is:

1. An information processing device comprising a server configured to communicate with a plurality of data acquisition units over a network, the server comprising:

a requester selection unit configured to select a requester of data concerning a certain location on a spatiotemporal map in which data changes with time from among the plurality of data acquisition units on the basis of at least one of contexts and profiles of the data acquisition units as well as contents of requested data;

a data requesting unit configured to request data from the requester;

a map generation unit configured to generate the spatiotemporal map using data from the requester; and a condition setting unit configured to set a condition for collecting data, wherein the requester selection unit selects the requester from among the data acquisition units capable of acquiring data that satisfies the set condition.

2. The information processing device according to claim 1, wherein the contexts of the data acquisition units include contexts of users who use the data acquisition units, and the request selection unit estimates likelihoods that the users provide data concerning the certain location on the basis of the contexts of the users, and selects the requester on the basis of an estimated result.

3. The information processing device according to claim 1, wherein the profiles of the data acquisition units include past track records of providing data of users who use the data acquisition units, and the request selection unit selects the requester on the basis of the past track records of providing data of the users.

4. The information processing device according to claim 1, further comprising:

an event detection unit configured to detect an event in a space corresponding to the spatiotemporal map on the basis of data from a plurality of the data acquisition units, wherein the requester selection unit selects a requester of data concerning a vicinity of a location in which the event has been detected.

5. The information processing device according to claim 1, wherein the requester selection unit selects a requester of data concerning a vicinity of a location specified by a user who uses the spatiotemporal map.

6. The information processing device according to claim 1, further comprising:

a reward setting unit configured to set a reward for data on the basis of a value of requested data, wherein the data requesting unit notifies the requester of a set reward.

7. The information processing device according to claim 6, wherein the reward setting unit sets the reward on the basis of an estimated value of the number of accesses to the requested data.

8. An information processing method comprising:
a requester selection step of selecting a requester of data concerning a certain location on a spatiotemporal map in which data changes with time from among a plurality of data acquisition units on the basis of at least one of contexts and profiles of the data acquisition units as well as contents of requested data;
a data requesting step of requesting data from the requester;
a map generation step of generating the spatiotemporal map using data from the requester; and
a condition setting step of setting a condition for collecting data,
wherein the requester is selected from among the data acquisition units capable of acquiring data that satisfies the set condition.

9. A non-transitory computer readable medium comprising a memory storing a program for causing a computer to execute a process, the process comprising:
a requester selection step of selecting a requester of data concerning a certain location on a spatiotemporal map in which data changes with time from among a plurality of data acquisition units on the basis of at least one of contexts and profiles of the data acquisition units as well as contents of requested data, wherein the selection is made by the computer and the computer is configured to communicate with the plurality of data acquisition units over a network,
a data requesting step of requesting data from the requester by the computer,
a map generation step of generating the spatiotemporal map using data from the requester, and
a condition setting step of setting a condition for collecting data,
wherein the requester is selected from among the data acquisition units capable of acquiring data that satisfies the set condition.

* * * * *